United States Patent
Nay et al.

(10) Patent No.: US 9,342,981 B1
(45) Date of Patent: *May 17, 2016

(54) INSTANTIATING AN APPLICATION BASED ON CONNECTION WITH A DEVICE VIA A UNIVERSAL SERIAL BUS

(71) Applicant: Google Inc., Mountain View, CA (US)

(72) Inventors: Shane R. Nay, San Jose, CA (US); Alan Howard Davis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/795,522

(22) Filed: Mar. 12, 2013

Related U.S. Application Data

(60) Provisional application No. 61/714,347, filed on Oct. 16, 2012.

(51) Int. Cl.
| | |
|---|---|
| *G08C 19/16* | (2006.01) |
| *G06F 9/44* | (2006.01) |
| *G08C 19/00* | (2006.01) |
| *G06Q 10/06* | (2012.01) |
| *H04L 12/12* | (2006.01) |
| *G06F 9/445* | (2006.01) |

(Continued)

(52) U.S. Cl.
CPC ............... *G08C 19/00* (2013.01); *G06Q 10/06* (2013.01); *G06F 8/65* (2013.01); *H04L 12/12* (2013.01); *H04L 41/12* (2013.01); *H04L 67/42* (2013.01)

(58) Field of Classification Search
CPC ......... H04L 67/42; H04L 41/12; H04L 12/12; H04L 12/14; H04L 12/1446; H04L 43/0817; H04L 65/1083; H04L 65/1016; G06Q 10/06

USPC .......................................... 340/870.01, 572.1
See application file for complete search history.

(56) References Cited

U.S. PATENT DOCUMENTS

| | | | | |
|---|---|---|---|---|
| 7,436,303 | B2 * | 10/2008 | Tourrilhes et al. | 340/572.1 |
| 7,562,123 | B2 * | 7/2009 | Reich | H04L 29/06 |
| | | | | 342/174 |
| 7,949,110 | B2 * | 5/2011 | Abichandani | H04L 12/66 |
| | | | | 379/106.01 |

(Continued)

OTHER PUBLICATIONS

Universal Serial Bus Specification, by Compaq et al., Revision 2.0, Apr. 27, 2000 [650 pages].

*Primary Examiner* — Firmin Backer
*Assistant Examiner* — Adnan Aziz
(74) *Attorney, Agent, or Firm* — Lerner, David, Littenberg, Krumholz & Mentlik, LLP

(57) ABSTRACT

An apparatus for managing telemetry sensor controllers identified by their communication port identifiers is disclosed. The apparatus may include a memory that stores telemetry sensor controller mappings, where a telemetry sensor controller mapping associates an equipment identifier for a telemetry sensor controller with a communication port identifier, and equipment identifier mappings, where an equipment identifier mapping associates an equipment identifier with a telemetry monitoring application. The apparatus may detect a connection with a telemetry sensor controller and receive an equipment identifier. The apparatus may then instantiate a telemetry monitoring application for managing the connected telemetry sensor controller by accessing the plurality of equipment identifier mappings with the received equipment identifier, where the telemetry monitoring application may instruct the connected telemetry sensor controller to perform a requestable operation.

22 Claims, 9 Drawing Sheets

(51) Int. Cl.
*H04L 12/24* (2006.01)
*H04L 29/06* (2006.01)

(56) References Cited

U.S. PATENT DOCUMENTS

| | | | | |
|---|---|---|---|---|
| 8,264,354 | B2* | 9/2012 | Groth et al. | 340/568.2 |
| 8,407,696 | B2* | 3/2013 | Alpern | G06F 8/65 717/168 |
| 8,533,601 | B2* | 9/2013 | LaForest | 715/736 |
| 8,779,922 | B2* | 7/2014 | Groth et al. | 340/568.2 |
| 2002/0095487 | A1* | 7/2002 | Day et al. | 709/223 |
| 2003/0046339 | A1* | 3/2003 | Ip | 709/203 |
| 2008/0123559 | A1* | 5/2008 | Haviv et al. | 370/255 |
| 2009/0282140 | A1* | 11/2009 | White et al. | 709/223 |
| 2010/0211669 | A1* | 8/2010 | Dalgas et al. | 709/224 |
| 2011/0047263 | A1* | 2/2011 | Martins et al. | 709/224 |
| 2011/0084839 | A1* | 4/2011 | Groth et al. | 340/572.1 |
| 2011/0258302 | A1* | 10/2011 | Cole et al. | 709/223 |
| 2012/0317259 | A1* | 12/2012 | Shikano | H04L 12/6418 709/223 |

* cited by examiner

INSTANTIATING AN APPLICATION BASED ON CONNECTION WITH A DEVICE VIA A UNIVERSAL SERIAL BUS

CROSS-REFERENCE TO RELATED APPLICATION

The present application claims the benefit of the filing date of U.S. Provisional Patent Application No. 61/714,347 filed Oct. 16, 2012, the disclosure of which is hereby incorporated herein by reference.

BACKGROUND

A datacenter may employ many different types of equipment. For example, the datacenter may have redundant or backup power supplies, redundant data communications connections, environmental controls (e.g., air conditioning, fire suppression) and security devices. In addition, the datacenter may have equipment for operating and managing a telecommunication network, providing applications to one or more customers, and providing hosted applications for a third-party to provide to its customers.

As the equipment in the datacenter may be costly or important to an operation (e.g., webpage hosting, Internet search and indexing, telecommunication networking, etc.), the equipment may provide telemetry information to inform the datacenter operator of the equipment's condition.

To access the telemetry information being provided by a given piece of equipment, the datacenter operator may establish a communication link between the given piece of equipment and a monitoring server. This arrangement can be problematic when there are numerous pieces of equipment being monitored at any given time since it requires the datacenter operator to expend resources in establishing communication links with each piece of monitored equipment.

Moreover, obtaining the telemetry information from the equipment being monitored is laborious when there are numerous pieces of equipment involved. Depending on the arrangement, a datacenter operator may have to query each piece of equipment individually. Furthermore, in the event of equipment failure, the datacenter operator may have to investigate where the failed equipment is located. Locating failed equipment in a datacenter can also be problematic since the location of a piece of equipment may be subject to change. This dynamic arrangement requires time and effort on behalf of the datacenter operator to find the equipment failure.

SUMMARY

To address these and other problems, this disclosure provides for an apparatus for managing telemetry sensor controllers. In one embodiment, the apparatus includes a memory operative to store an equipment identifier mapping that associates a first equipment identifier with a first telemetry monitoring application, and a processor in communication with the memory. The processor may be configured to detect a connection with a first telemetry sensor controller, receive the first equipment identifier from the first telemetry sensor controller, and establish a first telemetry sensor controller mapping in the memory for the first telemetry sensor controller, wherein the first telemetry sensor controller mapping is based on the first equipment identifier and a first communication port identifier for a communication port to which the first telemetry sensor controller is connected. The processor may also be configured to instantiate the first telemetry monitoring application for managing the first telemetry sensor controller based on an association of the first telemetry monitoring application with the first equipment identifier, wherein the first telemetry monitoring application is operable to instruct the first telemetry sensor controller to perform a requestable operation.

In another embodiment of the apparatus, the processor may be further configured to receive a second equipment identifier for a second telemetry sensor controller, and identify the second telemetry sensor controller as an orphaned telemetry sensor controller when on a comparison of the second equipment identifier with at least one telemetry monitoring application mapping of a plurality of telemetry monitoring application mappings stored in the memory indicates that the second equipment identifier is not included in the plurality of telemetry monitoring application mappings. The processor may also be configured to instantiate a second telemetry monitoring application for the second telemetry sensor controller when the second telemetry sensor controller is identified as the orphaned telemetry sensor controller.

In a further embodiment of the apparatus, the processor may be further configured to request the first telemetry monitoring application to check a status of the first telemetry sensor controller, and initiate a recovery procedure to recover a connection with the first telemetry sensor controller when the status of the first telemetry sensor controller indicates a problem.

In yet another embodiment of the apparatus, the memory may further store an operation mapping that comprises an association between a requestable operation and a second telemetry monitoring application, and the processor may be further configured to receive a request from a client device to perform the requestable operation. The processor may also be configured to instantiate the second telemetry monitoring application corresponding to the requestable operation, and perform the requestable operation with a second connected telemetry sensor controller managed by the second telemetry monitoring application.

In yet a further embodiment of the apparatus, the memory may store an operation mapping that comprises an association between a requestable operation and the first telemetry monitoring application, and the processor may be further configured to receive a request from a client device to perform the requestable operation. The processor may also be configured to instruct the first telemetry monitoring application to perform the requestable operation with the first telemetry sensor controller.

In another embodiment of the apparatus, the first telemetry monitoring application may be further operable to automatically determine a firmware version installed on the first telemetry sensor controller, and automatically transfer firmware to the first telemetry sensor controller when the determined firmware version installed on the first telemetry sensor controller is determined to not be a current version of the firmware available for the first telemetry sensor controller.

In a further embodiment of the apparatus, the equipment identifier may include a vendor identifier and a product identifier.

This disclosure also provides for another apparatus for managing telemetry sensor controllers. In one embodiment, the apparatus may include a telemetry sensor controller connected to a communication port, and a central management system in communication with the telemetry sensor controller. The central management system may include a memory that stores a telemetry monitoring application assignable to the telemetry sensor controller, and a processor in communication with the memory. The processor may be configured to identify a telemetry sensor controller type of the telemetry sensor controller, instantiate the telemetry monitoring application based on the identified telemetry sensor controller type, assign the telemetry monitoring application to the telemetry sensor controller, wherein the communication port to which the telemetry sensor controller is connected is associated with the telemetry monitoring application, and receive telemetry information from the telemetry sensor controller based on communications between the telemetry monitoring application and the telemetry sensor controller.

In another embodiment of the apparatus, the processor may be further configured to provide at least one requestable operation for the telemetry sensor controller to perform, wherein the at least one requestable operation is based on the identified telemetry sensor controller type. The processor may also be configured to receive a request for the at least one requestable operation, and perform the requestable operation with the telemetry sensor controller by informing the telemetry monitoring application that the at least one requestable operation was requested.

In a further embodiment of the apparatus, the processor may be configured to instruct the telemetry monitoring application to provide a status update on the telemetry sensor controller, the status update indicating whether the telemetry monitoring application is communicating with the telemetry sensor controller.

In yet another embodiment of the apparatus, the central management system may be one central management system of a plurality of central management systems. The apparatus may further include a telemetry application package server in communication with the plurality of central management systems. The telemetry application package server may be configured to store a telemetry application package for deployment to the plurality of central management systems, deploy the telemetry application package to the plurality of central management systems, monitor a deployment rate at which the telemetry application package is deployed to the plurality of central management systems, and adjust the deployment rate based on a number of successful deployments of the telemetry application package.

In yet a further embodiment of the apparatus, the telemetry application package server may be configured to adjust the deployment rate by increasing the deployment rate when the number of successful deployments of the telemetry application package exceeds a predetermined threshold rate.

In another embodiment of the apparatus, the telemetry application package server may be configured to control versioning of the telemetry application package based on the number of successful deployments of the telemetry application package.

This disclosure also provides for a method for managing telemetry sensor controllers. In one embodiment, the method includes detecting, with a processor, a connection with a first telemetry sensor controller, and receiving, with the processor, a first equipment identifier from the first telemetry sensor controller. The method may also include establishing a first telemetry sensor controller mapping in a computer-readable memory for the first telemetry sensor controller, wherein the first telemetry sensor controller mapping is based on the first equipment identifier and a first communication port identifier for a communication port to which the first telemetry sensor controller is connected. Furthermore, the method may include instantiating, with the processor, the first telemetry monitoring application for managing the first telemetry sensor controller based on an association of the first telemetry monitoring application with a first equipment identifier.

In another embodiment of the method, the first equipment identifier may be associated with the first telemetry monitoring application based on an equipment identifier mapping stored in the computer-readable memory, and the first telemetry monitoring application may be operable to instruct the first telemetry sensor controller to perform a requestable operation.

In a further embodiment of the method, the method may include receiving a second equipment identifier for a second telemetry sensor controller and identifying the second telemetry sensor controller as an orphaned telemetry sensor controller when on a comparison of the second equipment identifier with at least one telemetry monitoring application mapping of a plurality of telemetry monitoring application mappings stored in the computer-readable memory indicates that the second equipment identifier is not included in the plurality of telemetry monitoring application mappings. The method may also include instantiating, with the processor, a second telemetry monitoring application for the second telemetry sensor controller when the second telemetry sensor controller is identified as the orphaned telemetry sensor controller.

In yet another embodiment of the method, the method may include requesting the first telemetry monitoring application to check a status of the first telemetry sensor controller, and initiating a recovery procedure to recover a connection with the first telemetry sensor controller when the status of the first telemetry sensor controller indicates a problem.

In yet a further embodiment of the method, the method may include receiving a request from a client device to perform a requestable operation, wherein the requestable operation is based on an operation mapping stored in the computer-readable memory, and the operation mapping comprises an association between the requestable operation and a second telemetry monitoring application. The method may also include instantiating the second telemetry monitoring application corresponding to the requestable operation, and performing the requestable operation with a second connected telemetry sensor controller managed by the second telemetry monitoring application.

In another embodiment of the method, the method may include receiving a request from a client device to perform a requestable operation, wherein the requestable operation is based on an operation mapping stored in the computer-readable memory, and the operation mapping comprises an association between the requestable operation and the first telemetry monitoring application. The method may also include instructing the first telemetry monitoring application to perform the requestable operation with the first telemetry sensor controller.

In a further embodiment of the method, the method may include automatically determining a firmware version installed on the first telemetry sensor controller, and automatically transferring firmware to the first telemetry sensor controller when the determined firmware version installed on the first telemetry sensor controller is determined to not be a current version of the firmware available for the first telemetry sensor controller.

In yet another embodiment of the method, the equipment identifier may include a vendor identifier and a product identifier.

This disclosure also provides for another method for managing telemetry sensor controllers. In one embodiment, the method may include identifying, with a processor, a telemetry sensor controller type of a telemetry sensor controller connected to a communication port, and instantiating, with the processor, a telemetry monitoring application based on the identified telemetry sensor controller type. The method may also include assigning the telemetry monitoring application to the telemetry sensor controller, wherein the communication port to which the telemetry sensor controller is connected is associated with the telemetry monitoring application, and receiving telemetry information from the telemetry sensor controller based on communications between the telemetry monitoring application and the telemetry sensor controller.

In another embodiment of the method, the method may include receiving a request for at least one requestable operation, wherein the at least one requestable operation is based on the identified telemetry sensor controller type, and performing the requestable operation with the telemetry sensor controller by informing the telemetry monitoring application that the at least one requestable operation was requested.

In a further embodiment of the method, the method may include instructing, with the processor, the telemetry monitoring application to provide a status update on the telemetry sensor controller, the status update indicating whether the telemetry monitoring application is communicating with the telemetry sensor controller.

In yet another embodiment of the method, the method may include deploying a telemetry application package to a plurality of central management systems, monitoring a deployment rate at which the telemetry application package is deployed to the plurality of central management systems, and adjusting the deployment rate based on a number of successful deployments of the telemetry application package.

In yet a further embodiment of the method, the method may include adjusting the deployment rate by increasing the deployment rate when the number of successful deployments of the telemetry application package exceeds a predetermined threshold rate.

In another embodiment of the method, the method may include controlling versioning of the telemetry application package based on a number of successful deployments of the telemetry application package.

DETAILED DESCRIPTION

The present disclosure relates to a central management reporting system configured to centrally report telemetry information received from one or more telemetry sensor controllers. In one example, the central management reporting system establishes a proxy reporting application that monitors equipment connections with telemetry sensor controllers, and instantiates a telemetry monitoring application for each connected telemetry sensor controller. A telemetry sensor controller may include one or more telemetry sensors for collecting telemetry information about a piece of equipment being monitored by the telemetry sensor controller. Furthermore, a telemetry monitoring application may distribute firmware or otherwise configure an associated telemetry sensor controller based on updates provided by a telemetry monitoring application package server in communication with the central management reporting system. In this manner, the central management reporting system addresses an issue in configuring and managing multiple pieces of equipment without requiring user intervention during the configuration process.

Figure 1:
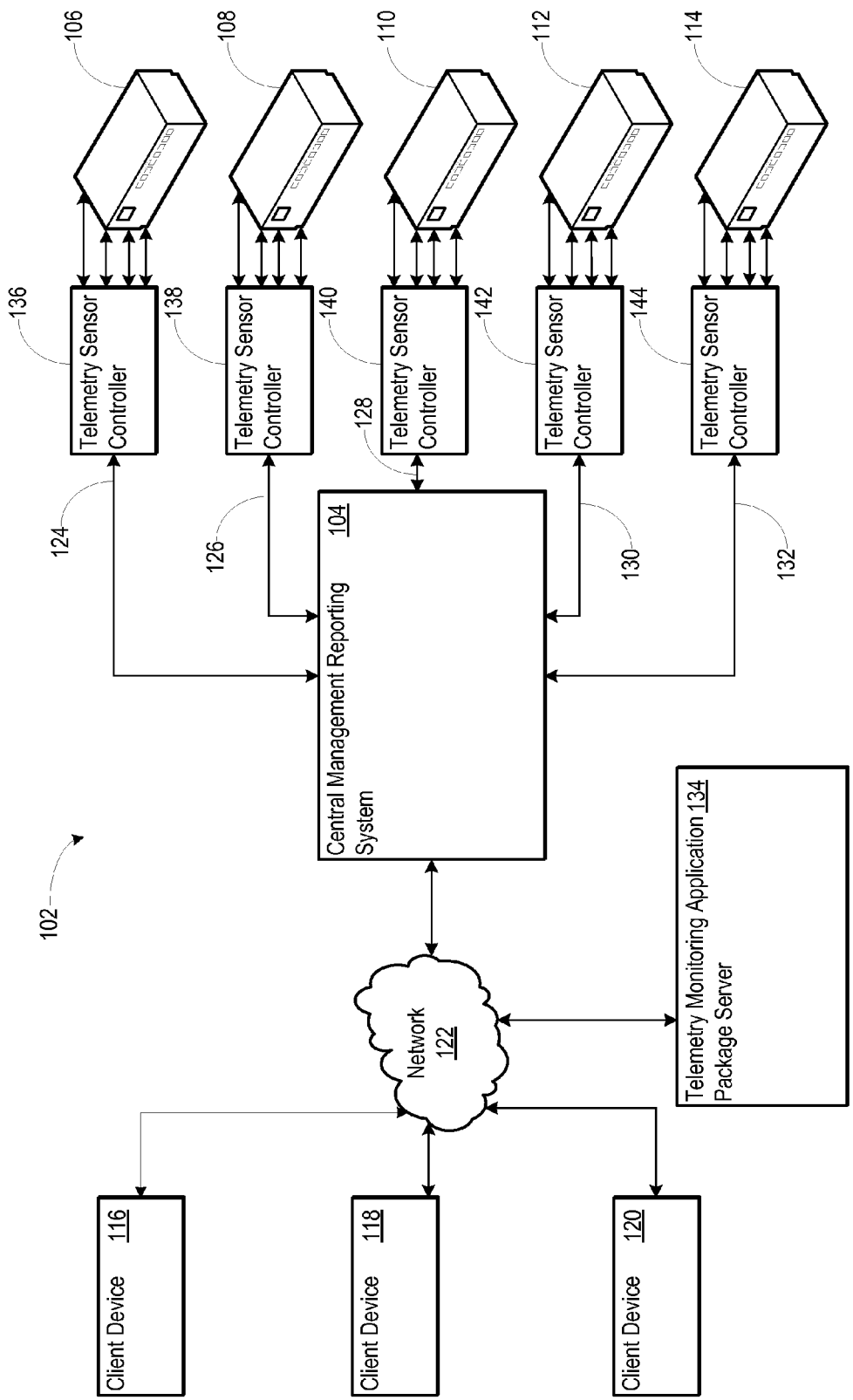
FIG. 1 illustrates an example of a central management reporting system in communication with client devices and monitored equipment according to aspects of the disclosure.

FIG. 1 illustrates an example of a datacenter environment 102 where a central management reporting system 104 is in communication with one or more client devices 116-120 and one or more telemetry sensor controllers 136-144. The telemetry sensor controllers 136-144 communicate with one or more telemetry sensors connected to one or more pieces of monitored equipment 106-114. The central management reporting system 104 may also be in communication with a telemetry monitoring application package server 134 operable to deliver telemetry monitoring application packages to the central management reporting system 104.

The monitored equipment 106-114 includes the types of equipment found in a datacenter, such as a rack appliance, a power supply, a security device, a server, a computing cluster, a networking device, or any other such equipment typically found in a datacenter. The monitored equipment 106-114 may also be any type of computing equipment, such as a desktop computer, a laptop computer, a tablet computer, a mobile device, or any other type of computing equipment. Moreover, the monitored equipment 106-114 includes combinations of datacenter equipment (e.g., computing clusters, rack appliance, etc.), consumer equipment (e.g., desktop computers, mobile devices, etc.), and any other type of equipment configured to provide telemetry information.

The telemetry sensor controllers 136-144 may communicate with one or more telemetry sensors connected to the monitored equipment 106-114. The telemetry sensors may gather telemetry information regarding an associated monitored equipment, and the telemetry sensor controllers may 136-144 may then provide this telemetry information to the central management reporting system 104.

The telemetry information provided by the telemetry sensor controllers 136-144 may include many different types of telemetry information. Examples of such telemetry information that may be collected include operational telemetry information, system-related telemetry information, environment telemetry information, etc. Operational telemetry information may include whether a piece of monitored equipment is operating, and the status of said operation. System-related telemetry information may include firmware or software versions installed on a monitored equipment, the amount of free memory available to the monitored equipment, and other such system-related telemetry information. Environment telemetry information may include the operational temperature of the monitored equipment, the humidity in or near the monitored equipment, the noise level in or near the monitored equipment, and other such environment telemetry information.

The central management reporting system 104 may be configured to collect telemetry information from the telemetry sensor controllers 136-144. In this regard, the gathering of the telemetry information may be active, passive, or a combination thereof. The telemetry information provided by a telemetry sensor controller may be provided by the equipment itself (e.g., the equipment may be configured to provide the telemetry information), by a sensor or other module connected to the monitored equipment (e.g., a temperature sensor, a barometer, etc.), or by a combination of the two.

In actively collecting the telemetry information, the central management reporting system 104 may be configured to query one or more of the telemetry sensor controllers 136-144 for telemetry information. Actively collecting telemetry information from one or more telemetry sensor controllers may include querying the one or more telemetry sensor controllers (or one or more sensors connected to a telemetry sensor controller) at predetermined time intervals. Furthermore, the predetermined time intervals may vary from one telemetry sensor controller to another telemetry sensor controller. Thus, the central management reporting system 104 may be configured to query a telemetry sensor controller monitoring a rack appliance every five minutes for telemetry information and configured to query a telemetry sensor controller monitoring a network router every thirty minutes for telemetry information. However, it is also contemplated that the central management reporting system 104 query one or more telemetry sensor controllers at substantially identical time intervals. The central management reporting system 104 may or may not be configured to wait for a response from a first telemetry sensor controller before querying a second telemetry sensor controller for telemetry information.

In addition, the central management reporting system 104 may be selective in the type of telemetry information gathered from a select telemetry sensor controller. In this regard, the central management reporting system 104 may request the type of telemetry information based on the type of telemetry sensor controller. In other words, the type of telemetry information requested from one telemetry sensor controller may be different than the type of telemetry information requested from another type of telemetry sensor controller. For example, the telemetry information requested from a telemetry sensor controller monitoring a power supply may be different than the telemetry information requested from a telemetry sensor controller monitoring a rack appliance. In this example, the telemetry information requested from the telemetry sensor controller monitoring the power supply may include the discharge state of the power supply and the telemetry information requested from the telemetry sensor controller monitoring the rack appliance may include the amount of data processed (e.g., search data, index data, e-mail data, etc.) by the rack appliance.

Furthermore, the central management reporting system 104 may be configured to query a telemetry sensor controller for any and/or all of the telemetry information that the telemetry sensor controller may provide. For example, the central management reporting system 104 may request that the telemetry sensor controller transmit its telemetry information and, in response, the telemetry sensor controller may simply report all of the telemetry information being monitored (e.g., all of the operational telemetry information, environment telemetry information, etc.). In this regard, generically requesting telemetry information from a telemetry sensor controller may or may not account for the different types of telemetry information that the telemetry sensor controller may provide.

Yet another approach to collecting telemetry information from a telemetry sensor controller may include an on-demand or real-time approach. In this regard, the central management reporting system 104 may query a given telemetry sensor controller for telemetry information when requested by a client device (e.g., any one of client devices 116-120) or based on the occurrence of an event (e.g., end of the business day, the detection of a failure in one or more of the monitored equipment, etc.).

The central management reporting system 104 may also leverage a passive approach to collecting telemetry information. With a passive approach, one or more of the telemetry sensor controllers 136-144 may be configured to report the telemetry information to the central management reporting system 104. Thus, the central management reporting system 104 may "listen" for incoming packets of data/information representing the telemetry information reported by a select telemetry sensor controller. In this passive approach, the telemetry sensor controllers 136-144 may take the "active" lead in reporting telemetry information to the central management reporting system 104. Thus, the telemetry sensor controllers 136-144 may report telemetry information to the central management reporting system 104 regardless whether the central management reporting system 104 queried the telemetry sensor controllers 136-144 for the telemetry information.

The central management reporting system 104 may communicate with the telemetry sensor controllers 136-144 via one or more communication channels 124-132. The communication channels 124-132 between the central management reporting system 104 and one or more telemetry sensor controllers 136-144 may be wired and/or wireless communication channels. Examples of wired communication channels are Ethernet, Universal Serial Bus ("USB"), external Serial Advanced Technology Attachment (e-SATA), Inter-Integrated Circuit ("I²C"), Small Computer System Interface ("SCSI"), and other such wired communication channels. Examples of wireless communication channels include Bluetooth (e.g., wireless communication channels operating in the 2400-2480 MHz band), the variations of IEEE 802.11 (e.g., IEEE 802.11a, IEEE 802.11b, etc.), Worldwide Interoperability for Microwave Access ("WiMAX"), and other such wireless technologies (e.g., any wireless technology operating in the industrial, scientific, and medical ("ISM") radio bands).

Figure 2:
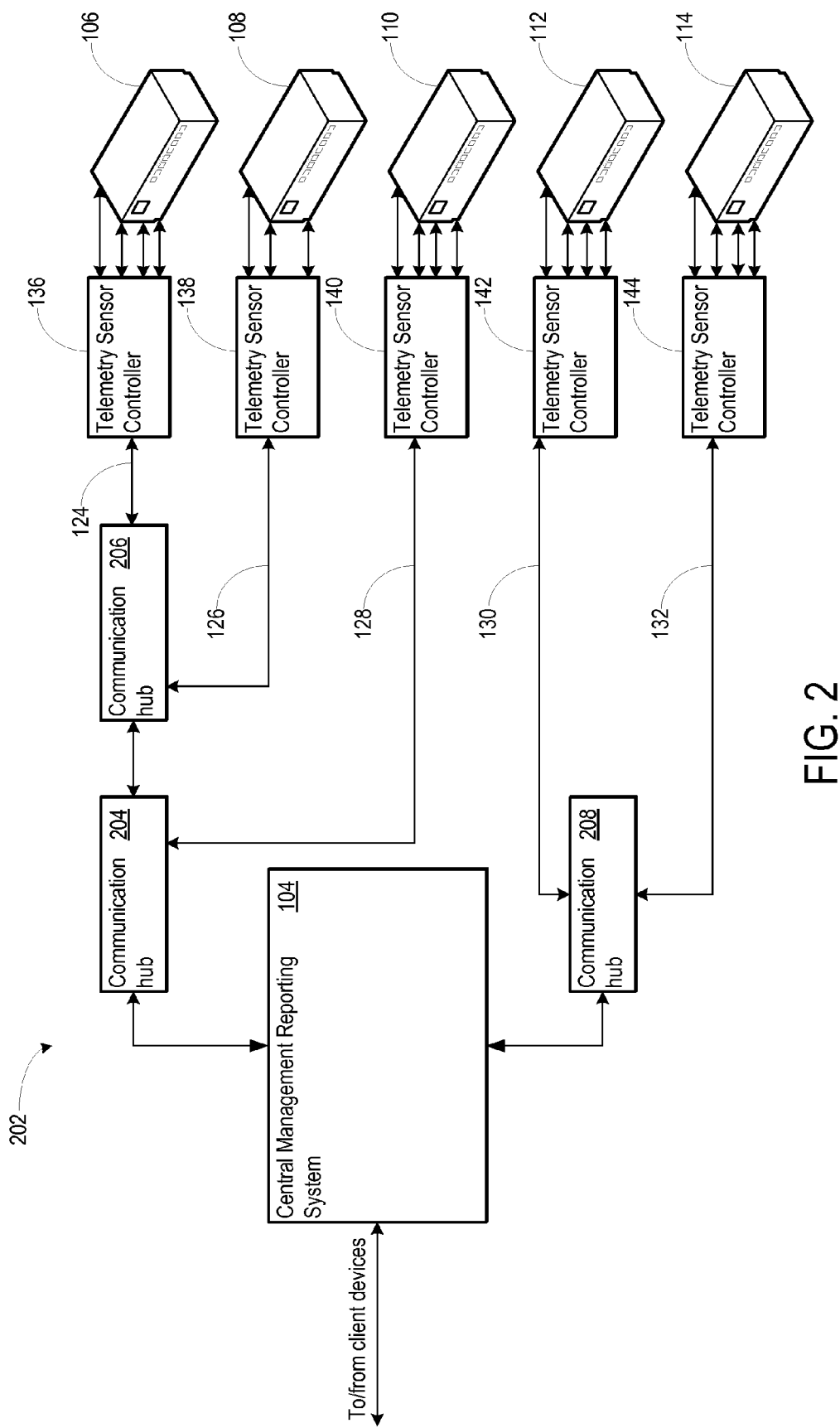
FIG. 2 illustrates an example of possible networking equipment that may be interposed between the central management reporting system and monitored equipment according to aspects of the disclosure.

In addition, there may be one or more intervening devices between the central management reporting system 104 and one or more of the telemetry sensor controllers 136-144. For instance, one or more of the telemetry sensor controllers 136-144 may be connected to a network switch or a USB hub (not shown in FIG. 1), and the network switch or USB hub may communicate with the central management reporting system 104. Moreover, it is contemplated that there may be several layers of intervening devices connecting the central management reporting system 104 and one or more of the telemetry sensor controllers 136-144. FIG. 2 illustrates one possible arrangement 202 of the central management reporting system 104 and the telemetry sensor controllers 136-144.

As shown in FIG. 2, the arrangement 202 of the central management reporting system 104 may place one or more of the telemetry sensor controllers 136-144 and monitored equipment 106-114 behind one or more communication hubs 204-208 (e.g., Ethernet switches, Ethernet hubs, USB hubs, etc). Moreover, there may be possible layers of the communication hubs 204-208 such that communication hubs 204/208 are in a first layer and network devices 206 is in a second layer. In this manner, there may be any number of intervening devices (e.g., network switches, network routers, network hubs, USB hubs, etc.) interposed between the central management reporting system 104 and the telemetry sensor controllers 136-144.

As discussed in more detail below, the central management reporting system 104 and the telemetry sensor controllers 136-144 may leverage a communication port identifier that identifies which communication port of a communication hub (e.g., communication hubs 204-208) a particular telemetry sensor controller 136-144 is connected to. As the network topology of the arrangement 202 may be static (e.g., each of the telemetry sensor controllers is known to be in a specific location and connected to a specific port of a network equipment), the communication port identifier may be further correlated to the physical location of a given telemetry sensor controller. Thus, when the reported telemetry information indicates that there is a potential problem with a given telemetry sensor controller, the central management reporting system 104 may quickly identify the physical location of the troubled telemetry sensor controller and/or troubled monitored equipment based on the communication port identifier assigned to the telemetry sensor controller.

Referring back to FIG. 1, one or more of the client devices 116-120 may also be in communication with the central management reporting system 104. The client devices 116-120 may communicate with the central management reporting system 104 via a network 122. It is also contemplated that the client devices 116-120 may be directly connected to the central management reporting system 104 or that there be any number of intervening devices between the client devices 116-120 and the central management reporting system 104.

In communicating with the client devices 116-120, the central management reporting system 104 may be configured to provide one or more requestable operations that are performable by a given telemetry sensor controller. Furthermore, the requestable operations may be based on the type of telemetry sensor controller in communication with the central management reporting system 104. For example, where the telemetry sensor controller is monitoring a power supply, the central management reporting system 104 may provide that a system test, such as a battery discharging test, is a requestable operation. As another example, where the telemetry sensor controller is monitoring a cooling fan, the central management reporting system 104 may provide another system test, such as a rotational speed test, as a requestable operation.

The network 122 may be any type of network, such as a wired network, a wireless network, or a combination thereof. Examples of wired networks include Ethernet networks, Local Area Networks, Wide Area Networks, and other such wired networks. The one or more wired networks of the network 122 may be established using any communication medium such as optical fiber, twisted pair cabling, twinaxial cabling, a backplane system, or any other such medium. Examples of wireless networks include networks established using any variant of IEEE 802.11, Bluetooth, WiMAX and other such wireless protocols. There may be any number of wired and/or wireless networks between a given client device and the central management reporting system 104.

The present disclosure contemplates that the central management reporting system 104 may communicate with individual client devices (e.g., a desktop computer, a smartphone, etc.) as well as enterprise systems (e.g., a provisioning system, web hosting system, Internet search system, etc.)

Any one of the client devices 116-120 may request telemetry information from the central management reporting system 104. In one example, a client device may request telemetry information for a specific monitored equipment (e.g., monitored equipment 106) and/or from a specific telemetry sensor controller (e.g., telemetry sensor controller 136). In another example, a client device may request a specific type of telemetry information for a specific monitored equipment (e.g., operating telemetry information for the monitored equipment 106) and/or a specific telemetry sensor controller (e.g., operating telemetry information for the telemetry sensor controller 136). It is also contemplated that a client device may request all telemetry information for all of the monitored equipment 106-114 and/or from all of the telemetry sensor controllers 136-144. Thus regardless of the request, the central management reporting system 104 may be configured to provide any type of telemetry information from any one of the telemetry sensor controllers 136-144 to any one of the client devices 116-120.

In addition, any one of the client devices 116-120 may request an operation be performed by equipment being monitored by any one of the telemetry sensor controllers 136-144. As one example, a client device may request a list of performable operations from the central management reporting system 104, and the central management reporting system 104 may transmit the list of these performable operations. The list of requestable operations may be compiled by the central management reporting system 104 at predetermined time intervals, when a predetermined event occurs (e.g., a telemetry sensor controller is connected to the central management reporting system 104), or a combination thereof. When a client devices requests that an operation be performed, the central management reporting system 104 may instruct one or more of the telemetry sensor controllers 136-144 to perform the requested operation. The one or more telemetry sensor controllers 136-144 may then communicate the results of the performed operation to the central management reporting system 104 for reporting to the client device that requested the operation.

Figure 3:
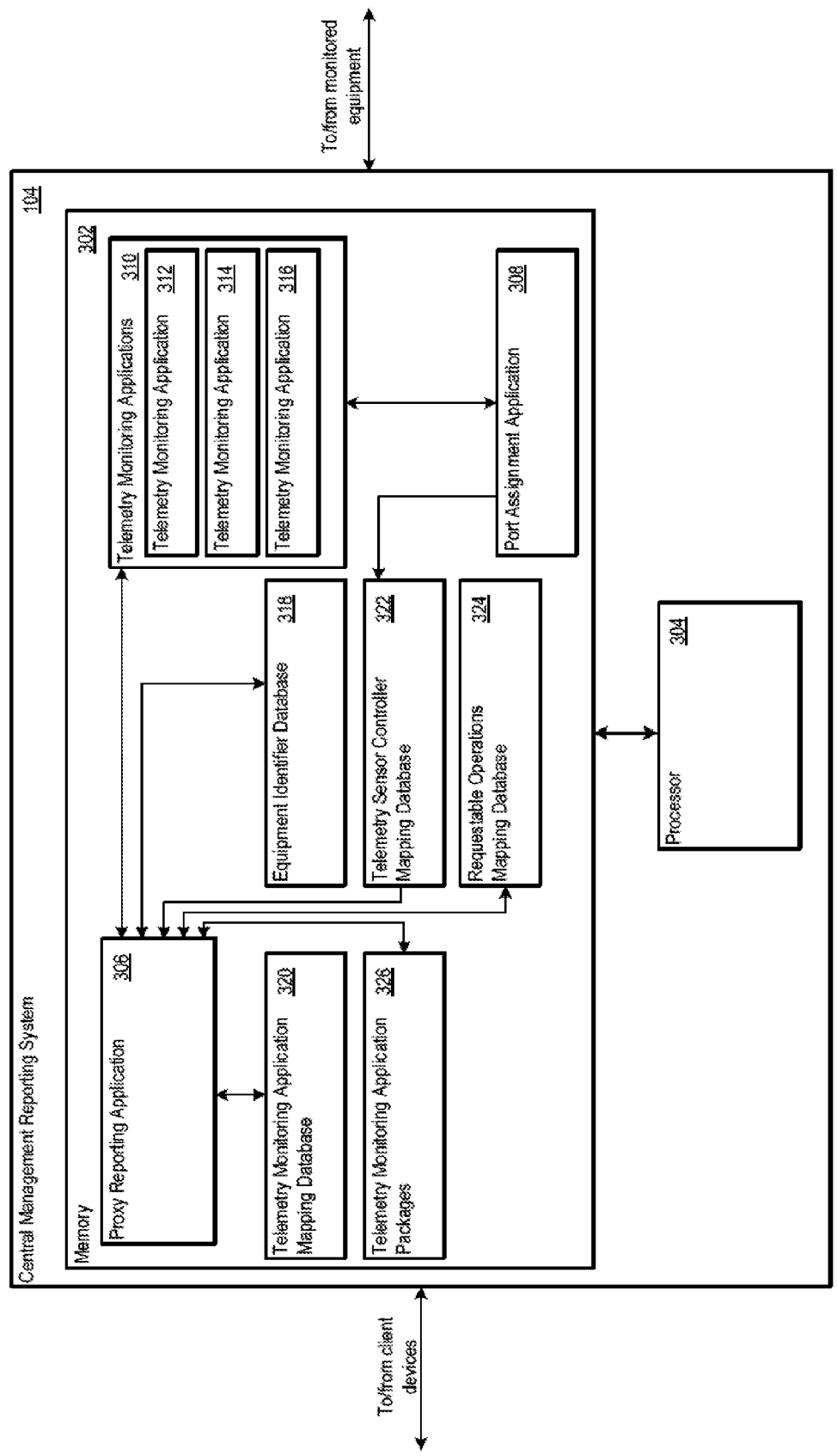
FIG. 3 illustrates an example of the central management reporting system of FIG. 1 according to aspects of the disclosure.

FIG. 3 illustrates an example of the central management reporting system 104. The central management reporting system 104 may include a memory 302 in communication with a processor 304. The central management reporting system 104 may instantiate and/or store any number of applications in the memory 302, such as a proxy reporting application 306, a port assignment application 308, and a set of telemetry monitoring applications 310 (e.g., one or more monitoring applications 312-316), a communication port assignment application 308, and a device assignment application 328. The memory 302 may further store one or more databases, such as a telemetry monitoring application database 320, an equipment identifier database 318, a telemetry sensor controller mapping database 322, and a requestable operations mapping database 324.

Moreover, the memory 302 may store one or more telemetry monitoring application packages 326, which may include one or more telemetry monitoring applications associated with firmware for transferring to one or more telemetry sensor controllers 136-144. As discussed below with reference to FIGS. 4-5, a telemetry monitoring application may be associated with firmware used to control the operations of an associated telemetry sensor controller. A telemetry monitoring application for a corresponding telemetry sensor controller may transfer the associated firmware to the telemetry sensor controller when the telemetry monitoring application detects that the firmware installed on the telemetry sensor controller is outdated or is different than the firmware associated with the telemetry monitoring application package.

The processor 304 may be any conventional processor or microprocessor, such as a central processing unit ("CPU"), or a dedicated device such as an application-specific integrated circuit ("ASIC").

Although FIG. 3 functionally illustrates the processor 304, the memory 302, and other elements of the central management reporting system 104 as being within the same block, it will be understood by those of ordinary skill in the art that the processor 304 and the memory 302 may actually comprise multiple processors and memories that may or may not be stored within the same physical housing. For example, the memory 302 may be a hard drive or other storage media located in a housing different from that of the central management reporting system 104. Accordingly, references to one or more processors, one or memories, the central management reporting system 104, or a computer will be understood to include references to a collection of processors or computers or memories that may or may not operate in parallel. Rather than using a single processor to perform the operations described herein, some of the components may each have their own processor that perform operations related to the component's specific function.

The memory 302 may be of any type of memory operative to store information accessible by the processor 304, including a computer-readable medium, or other medium that stores data that may be read with the aid of an electronic device, such as a hard-drive, memory card, read-only memory ("ROM"), random-access memory ("RAM"), an electrically erasable programmable read-only memory ("EEPROM"), one or more a digital video disc ("DVD") or other optical disks, as well as other write-capable and read-only memories. Systems and methods may include different combinations of the foregoing, whereby different portions of the software functionalities of the central management reporting system 104 are stored on different types of media.

The memory 302 may include any set of computer-executable instructions to be executed directly (such as machine code) or indirectly (such as scripts) by the processor 304. For example, the computer-executable instructions may be stored as computer code on a computer-readable medium. In that regard, the terms "instructions," "programs," and "applications" may be used interchangeably herein. The instructions may be stored in object code format for direct processing by the processor 304, or in any other computer language including scripts or collections of independent source code modules that are interpreted on demand or compiled in advance. Functions, methods and routines of these instructions are explained in more detail below.

The information stored within the databases 318-324 may be may be retrieved, stored or modified by the processor 304. For instance, although systems and methods disclosed herein are not limited by any particular data structure, the databases 318-324 may be stored in computer registers, as one or more relational databases defined by a table having a plurality of different fields and records, Extensible Markup Language ("XML") documents, flat files, a multi-dimensional array (e.g., a 1-dimensional array, a 2-dimensional array, etc.) or combinations thereof. The databases 318-324 may also be formatted in any computer-readable format. In addition, the databases 318-324 may comprise any information sufficient to identify the relevant information, such as numbers, descriptive text, proprietary codes, references to data stored in other areas of the same memory or different memories (including other network locations) or information that is used by an application to calculate and/or store the relevant data.

In various examples described herein, the processor 304 may be located remote from the central management reporting system 104 and may communicate with one or more components and/or applications, such as the memory 302 and/or applications 308-310, wirelessly over a network (e.g., a local area network, a wide area network, etc.). In addition, one or more of the components may be housed within other servers or computers, and the central management reporting system 104 may receive information from those components. For example, one or more databases 318-324 may be stored in another server or computer and the processor 304 may receive information from each of these other servers and/or computers. In other aspects, some of the processes described herein are executed on a processor disposed within the central management reporting system 104 and others by a remote processor housed within a server being monitored, including performing operations for gathering and/or reporting telemetry information of one or more monitored equipment.

The central management reporting system 104 may instantiate a proxy reporting application 306. Instantiating the proxy reporting application 306, and any other of the disclosed applications, may include executing one or more computer-readable instructions stored in the memory 302.

The proxy reporting application 306 may provide a central communication interface by which a client device may request telemetry information from one or more of the telemetry sensor controllers. As the operation of one or more telemetry sensor controllers connected with the central management reporting system 104 may vary at any given time (e.g., a rack appliance may be operational at one time, but not operational at another time), the proxy reporting application 306 provides a convenient central destination for requesting telemetry information from a telemetry sensor controller so that a client device does not have to keep track of whether a given telemetry sensor controller is connected to the central management reporting system 104.

Upon instantiation, the proxy reporting application 306 may request a communication identifier, such as a communication port number, from the port assignment application 308. As is understood in computing, a communication port may be an application-specific or process-specific software construct serving as a communications endpoint in a computer's host operating system. The communication port may be identified by a 16-bit number, commonly known as the port number. Although a 16-bit number is typical, other bit sizes of port numbers is also contemplated, such as 32-bit numbers, 64-bit numbers, 128-bit numbers, and so forth.

Examples of typical communication ports include communication port 80 for Hypertext Transfer Protocol ("HTTP") communications, communication port 21 for File Transfer Protocol ("FTP") communications, and communication port 110 for Post Office Protocol (POPS) communications. The port assignment application 308 may be a module or system-related process running on the central management reporting system 104, and may be responsible for assigning communication port numbers to applications that request them. Accordingly, the proxy reporting application 306 may request a port number from the port assignment application 308.

While, in one example, the communication port number assigned to the proxy reporting application 306 is dynamic (e.g., the proxy reporting application 306 is assigned a communication port number based on whichever communication port number is available), the communication port number assigned to the proxy reporting application 306 may instead be a static communication port number. In this regard, the central management reporting system 104 may be configured to assign the same communication port number to the proxy reporting application 306 each time the proxy reporting application 306 is instantiated.

With a statically assigned communication port number, a client device (or user thereof) may be informed beforehand of the communication port number for the proxy reporting application 306. Thus, a given client device may start communicating immediately with the proxy reporting application 306. With a dynamically assigned communication port number, the given client device may first communicate with the central management reporting system 104 to obtain the communication port number assigned to the proxy reporting application 306, and then the given client device may start communicating with the proxy reporting application 306.

Although the communication port number assigned to the proxy reporting application 306 may be "static" (e.g., the same communication port number is assigned each time the proxy reporting application 306 is instantiated), the communication port number may be configurable. Thus, the communication port number assigned to the proxy reporting application 306 may be subject to change, but may not necessarily change each time the proxy reporting application 306 is instantiated.

After instantiation, the proxy reporting application 306 may "listen" for connections between the central management reporting system 104 and one or more of the telemetry sensor controllers. For example, when a USB connection is established with a telemetry sensor controller, the operating system executing on the central management reporting system 104 may notify the proxy reporting application 306 of the USB connection. The proxy reporting application 306 may also be informed of disconnections with one or more telemetry sensor controllers. In this manner, the proxy reporting application 306 is made aware of connections and disconnections between the central management reporting system 104 and connected or disconnected telemetry sensor controllers.

A telemetry sensor controller may then be connected to the central management reporting system 104. In one example, the telemetry sensor controller may be directly connected to the central management reporting system 104 (e.g., without intervening devices between the telemetry sensor controller and the central management reporting system 104). A device assignment application 328 may handle the instantiation of software interfaces to one or more of the connected telemetry sensor controllers. In this example, when the telemetry sensor controller is connected, the device assignment application 328 may learn of the physical communication port to which the telemetry sensor is connected. For example and with regard to the USB standard, the device assignment application 328 may receive an event notification that the telemetry sensor controller has been connected to the central management reporting system 104. Then, through the process of establishing a connection with the telemetry sensor controller as established by the USB standard, the device assignment application 328 may be informed of the physical communication port to which the telemetry sensor controller is connected.

In another example, a communication hub (e.g., a network switch, a USB hub, etc.) may be connected to the central management reporting system 104, in which one or more telemetry sensor controllers are connected (indirectly or directly) to the communication hub. When establishing the connection with the central management reporting system 104, the communication hub may report on the devices connected to the communication hub, including devices downstream (e.g., other network switches, network hubs, USB hubs, telemetry sensor controllers, and other devices). Moreover, in reporting the devices indirectly or directly connected to the communication hubs and connected to the central management reporting system 104, the central management reporting system 104 (e.g., the device assignment application 328) may build one or more identifiers representative of the network topology for one or more of the connected devices. In this manner, the device assignment application 328 may be informed of the physical communication port to which a telemetry sensor is connected.

In enumerating the telemetry sensor controllers connected, directly or indirectly, the device assignment application 328 may receive an equipment identifier for the telemetry sensor controller. The equipment identifier may identify the type of telemetry sensor controller and may be stored in a memory of the telemetry sensor controller, such as an EEPROM or the like. More particularly, the equipment identifier may establish a product identifier and a vendor identifier for the telemetry sensor controller. The product identifier may identify a specific model of the telemetry sensor controller and the vendor identifier may identify the vendor that provided the telemetry sensor controller. In addition, the equipment identifier may be customized for a telemetry sensor controller so that the central management reporting system 104 may distinguish between the various types of telemetry sensor controllers connected to it.

After obtaining the communication port identifier and the equipment identifier for a select telemetry sensor controller, the device assignment application 328 may establish an association between the communication port identifier and the equipment identifier in the telemetry sensor controller mapping database 322. As telemetry sensor controllers are connected and disconnected from the central management reporting system 104, the device assignment application 328 may add (when a telemetry sensor controller is connected) and/or remove (when a telemetry sensor controller is disconnected) telemetry sensor controller mappings from the telemetry sensor controller mapping database 322.

The equipment identifier database 314 may include one or more mappings between a telemetry sensor controller equipment identifier and a telemetry monitoring application. The equipment identifier database 314 may be referenced by the proxy reporting application 306 in determining which telemetry monitoring application to instantiate for a select telemetry sensor controller. A telemetry sensor controller equipment identifier may also be associated with one or more telemetry monitoring applications. Similarly, a telemetry monitoring application may be associated with one or more telemetry sensor controller equipment identifiers. The central management reporting system 104 may include the equipment identifier database 314 because different telemetry monitoring applications may have different functionalities. For example, a telemetry monitoring application for a telemetry sensor controller that monitors a power supply may have different functionalities than a telemetry monitoring application for a telemetry sensor controller that monitors a hard drive or rack appliance. In this manner, the equipment identifier database 314 assists the proxy reporting application 306 in determining which telemetry monitoring application to instantiate.

When the proxy reporting application 306 instantiates a telemetry monitoring application (e.g., any one of the telemetry monitoring applications 312-316) the instantiated telemetry monitoring application may request a communication port number from the port assignment application 308. The port assignment application 308 may then assign a communication port number to the requesting telemetry monitoring application. The communication port number assigned to the telemetry monitoring application may be a randomly assigned communication port number such that a given telemetry monitoring application may have a different communication port number each time the telemetry monitoring application is instantiated.

Moreover, when multiple telemetry monitoring applications (e.g., telemetry monitoring applications 312-316) are being executed by the central management reporting system 104, each telemetry monitoring application may be assigned a different communication port number. Being assigned different communication port numbers may prevent messages intended for one telemetry monitoring application being sent to (or received by) another telemetry monitoring application.

The telemetry monitoring application may then transmit a message using a communications protocol (e.g., TCP/IP) to inform the telemetry sensor controller of the communications port number assigned to the telemetry monitoring application. When the telemetry sensor controller receives a request for telemetry information from the central management reporting system 104 or the telemetry sensor controller transmits a message containing telemetry information to the central management reporting system 104, the telemetry sensor controller may reference the communication port number assigned to the telemetry monitoring application.

In addition, the telemetry monitoring application may inform the proxy reporting application 306 of the communication port number it was assigned. To this end, the proxy reporting application 306 may maintain the telemetry monitoring application database 320. The telemetry monitoring application database 320 may include one or more mappings between a given telemetry monitoring application and a given communication port number.

Furthermore, the proxy reporting application 306 may update the primary telemetry monitoring application database 320 with associations between a telemetry monitoring application and the physical port to which a telemetry sensor controller is connected. As discussed previously with respect to FIG. 2, each of the telemetry sensor controllers 106-114 may be physically connected to a communication port (e.g., a USB port or Ethernet port) of a communication hub (e.g., communication hub 206). In one example, the proxy reporting application 306 may retrieve a communication port identifier from the telemetry sensor controller mapping database 322, and update the telemetry monitoring application database 320 with the retrieved communication port identifier.

As the disclosure contemplates that the telemetry sensor controllers 106-114 may not be physically removed from its location during operating, the telemetry monitoring application for the corresponding monitored equipment may also report to the proxy reporting application 306 which physical port the monitored equipment is connected to.

For example, and with reference to FIG. 2, suppose that network switch 204 has four ports (logically numbered "1," "2," "3," and "4") and that network switch 206 also has four ports (logically numbered "1," "2," "3," and "4"). Further suppose that the telemetry sensor controller 110 is connected to port 1 of communication hub 204, communication hub 206 is connected to port 2 of communication hub 204, the telemetry sensor controller 106 is connected to port 1 of the communication hub 206, and the telemetry sensor controller 108 is connected to port 2 of the communication hub 206. In this example, the device assignment application 328 may build a network topology that indicates a communication port identifier of "2s1p2p1" for the telemetry sensor controller 106, where "2s1" represents communication hub 204, "2s1p2" represents that communication hub 206 is connected to port 2 of communication hub 204, and "2s1p2p1" represents that communication hub 106 is connected to port 1 of communication 206. Further still, the device assignment application 328, the proxy reporting application 306, or a telemetry monitoring application, may traverse the telemetry sensor controller mapping database 322 to construct the communication port identifier.

Based on the foregoing example, and with reference to the telemetry sensor controller 112, one would understand that, if the corresponding communication identifier was "2s3p1," that the telemetry sensor controller monitored equipment 112 was physically connected to port 1 of communication hub 208. Similarly, if the communication identifier of "2s3p2" was assigned to the telemetry sensor controller 114, that the telemetry sensor controller 114 was physically connected to port 2 of the communication hub 208.

In this manner, the proxy reporting application 306 may also maintain an association of the telemetry sensor controllers and the physical port to which a telemetry sensor is connected. Thus, when received telemetry information indicates that a telemetry sensor controller is experiencing a malfunction (e.g., in a connected sensor, in the equipment being monitored, etc.) or operating deficiently, a technician may query the proxy reporting application 306 for the physical port to which the telemetry sensor controller is connected, and then readily identify the physical location of the malfunction.

Although the foregoing discussion contemplates that a telemetry sensor controller, a telemetry monitoring application, and/or the device assignment application 328 may provide a communication port identifier for the physical port to which the telemetry sensor controller is connected, this disclosure also contemplates that such information may be stored beforehand. For example, the central management reporting system 104 may maintain a network topology database (not shown) that contains a physical port mapping between a telemetry sensor controller and the physical port to which the telemetry sensor controller is connected. By traversing the entries in the network topology database and correlating the physical port numbers in the network topology database with the application mappings of the telemetry monitoring application database 320 and/or the telemetry sensor controller mapping database 322 and/or the secondary application mapping database 322, the proxy reporting application 306 may identify the physical port to which a telemetry sensor controller is connected for a corresponding telemetry monitoring application.

Thus, the proxy reporting application 306 may maintain the primary telemetry monitoring application database 320 to keep track of which communication port identifiers (e.g., communication port numbers and/or physical port numbers) are assigned to which telemetry monitoring applications and telemetry sensor controllers. Moreover, an entry in the telemetry monitoring application database 320 may be created each time a telemetry monitoring application is instantiated. Similarly, an entry in the primary telemetry monitoring application database 320 may be removed when a telemetry sensor controller is disconnected from the central management reporting system 104 or powered off, and the corresponding telemetry monitoring application for the removed telemetry sensor controller is terminated. To this end, the primary telemetry monitoring application database 320 may represent the current state of telemetry sensor controllers that are connected to the central management reporting system 104.

In one example of the central management reporting system 104, the proxy reporting application 306 may instantiate a telemetry monitoring application based on comparisons with the mappings stored in the telemetry sensor controller mapping database 322 and the mappings stored in the telemetry monitoring application database 320. In this example, the proxy reporting application 306 may compare the communication port identifiers of the telemetry sensor controller mappings with the communication port identifiers of the application mappings. When the proxy reporting application 306 identifies that a communication port identifier is missing from the telemetry monitoring application database 320, the proxy reporting application 306 may determine that a telemetry monitoring has not yet been instantiated for the telemetry sensor controller corresponding to the missing communication port identifier.

When the proxy reporting application 306 determines that a telemetry monitoring application has not yet been instantiated for a select telemetry sensor controller, the proxy reporting application 306 may determine that the telemetry sensor controller is an "orphaned" telemetry sensor controller (e.g., a telemetry sensor controller not associated with a corresponding telemetry monitoring application). Based on this determination, the proxy reporting application 306 may retrieve the equipment identifier for the "orphaned" telemetry sensor controller. Using the retrieved equipment identifier, the proxy reporting application 306 may then identify a corresponding telemetry monitoring application based on the equipment identifier mappings stored in the equipment identifier database 318. More particularly, the proxy reporting application 306 may identify the correct telemetry monitoring application to instantiate based on the retrieved equipment identifier. The proxy reporting application may then instantiate the telemetry monitoring application and update the telemetry monitoring application database 320 as discussed above.

While the above description focuses on identifying an orphaned telemetry sensor controller during instantiation of a telemetry monitoring application, the proxy reporting application 306 may be configured to periodically check for whether there are one or more orphaned telemetry sensor controllers in communication with the central management reporting system 104. For example, the proxy reporting application 306 may be configured to identify orphaned telemetry sensor controllers at predetermined time intervals, such as every thirty seconds, every five minutes, or at any other time interval. The proxy reporting application 306 may be configured to check for orphaned telemetry sensor controllers at predetermined time intervals because one or more telemetry monitoring applications may have unexpectedly terminated. Where a telemetry monitoring application has unexpectedly terminated, the proxy reporting application 306 may re-instantiate the terminated telemetry monitoring application according to the aspects disclosed herein.

In instantiating a telemetry monitoring application, the proxy reporting application 306 may refer to one or more telemetry monitoring application packages 326. A telemetry monitoring application package may include a telemetry monitoring application to instantiate and an associated firmware for a telemetry sensor controller. In this regard, the telemetry monitoring application package may establish a mapping between a telemetry monitoring application and its associated firmware. The telemetry monitoring application package may also include additional information, such as the version of the firmware, the version of the telemetry monitoring application, the date in which the telemetry monitoring application package was loaded onto the central management reporting system 104, and other such information.

A telemetry monitoring application package may be loaded onto the central management reporting system 104 in a variety of ways. In one example, an operator using a computer-readable medium (e.g., a CD-ROM, DVD-ROM, USB memory media, etc.) may copy one or more telemetry monitoring application packages 326 to the central management reporting system 104 from the computer-readable medium. Upon receiving the copied telemetry monitoring application packages 326, the proxy reporting application 306 may update one or more telemetry monitoring applications and/or corresponding firmwares according to the aspects disclosed herein.

In another example, the central management reporting system 104 may communicate with the telemetry monitoring application package server 134 to retrieve one or more telemetry monitoring application packages. The telemetry monitoring application package server 134 may include one or more telemetry monitoring application packages for delivery to the central management reporting system 104.

The telemetry monitoring application packages residing on the telemetry monitoring application package server 134 may include various types of information. In one example, a telemetry monitoring application package may include a telemetry monitoring application, a telemetry monitoring application and corresponding firmware for a telemetry sensor controller, a functional application (i.e., an application that is always instantiated and not associated with any particular device), or combinations of the foregoing.

In addition, a telemetry monitoring application package may include configuration information that applies to one or more of the types of information included with the telemetry monitoring application package. For example, the configuration information may have various configurations for the telemetry monitoring application, various configurations for the firmware, and so forth. Selecting which of the configuration information to use may be based on one or more factors, such as time, operator configuration, or other such factors.

Moreover, the telemetry monitoring application package server 134 may include different versions of the same telemetry monitoring application packages for delivery to the central management reporting system 104. Versioning of a telemetry monitoring package may be based on various factors, such as time, operator configuration, or other such factors. For example, the telemetry monitoring application package server 134 may have a first telemetry monitoring application package that includes version 1.0 of the telemetry monitoring application and version 1.0 of the corresponding firmware for the telemetry sensor controller, a second telemetry monitoring application package that includes version 1.5 of the telemetry monitoring application and version 1.2 of the corresponding firmware, and so forth. As another example, an operator of the telemetry monitoring application packager server 134 and/or central management reporting system 104 may configure which versions of the telemetry monitoring application package to deploy. More particularly, a first version of the telemetry monitoring application package may be deployed to a first central management reporting system, whereas a second version of the telemetry monitoring application package is deployed to a second central management reporting system. Thus, different central management reporting systems may be receive different versions of a telemetry monitoring application package.

The telemetry monitoring application package server 134 may have different versions of the same telemetry monitoring application package because of potential problems that may arise during operation of the telemetry monitoring application and/or corresponding telemetry sensor controller. For example, suppose that the central management reporting system 104 retrieves a first telemetry monitoring application package that includes version 1.5 of the telemetry monitoring application and version 1.2 of the corresponding firmware. In this example, after the telemetry monitoring application loads the version 1.2 firmware into the corresponding telemetry sensor controller, the telemetry sensor controller may start to malfunction, which is determined to be because of the updated firmware.

When the proxy reporting application 306 detects a malfunction in the telemetry sensor controller, the proxy reporting application 306 may request a second telemetry monitoring application package that includes an older, and possibly known to be more stable, version of the firmware. In this example, the telemetry monitoring application may request a telemetry monitoring application package that includes a version 1.0 of the firmware (e.g., the older, but more stable version of the firmware), and then may load the version 1.0 of the firmware into the malfunctioning telemetry sensor controller (thus replacing the version 1.2 of the firmware) in an attempt to fix the malfunctioning telemetry sensor controller.

Figure 4:
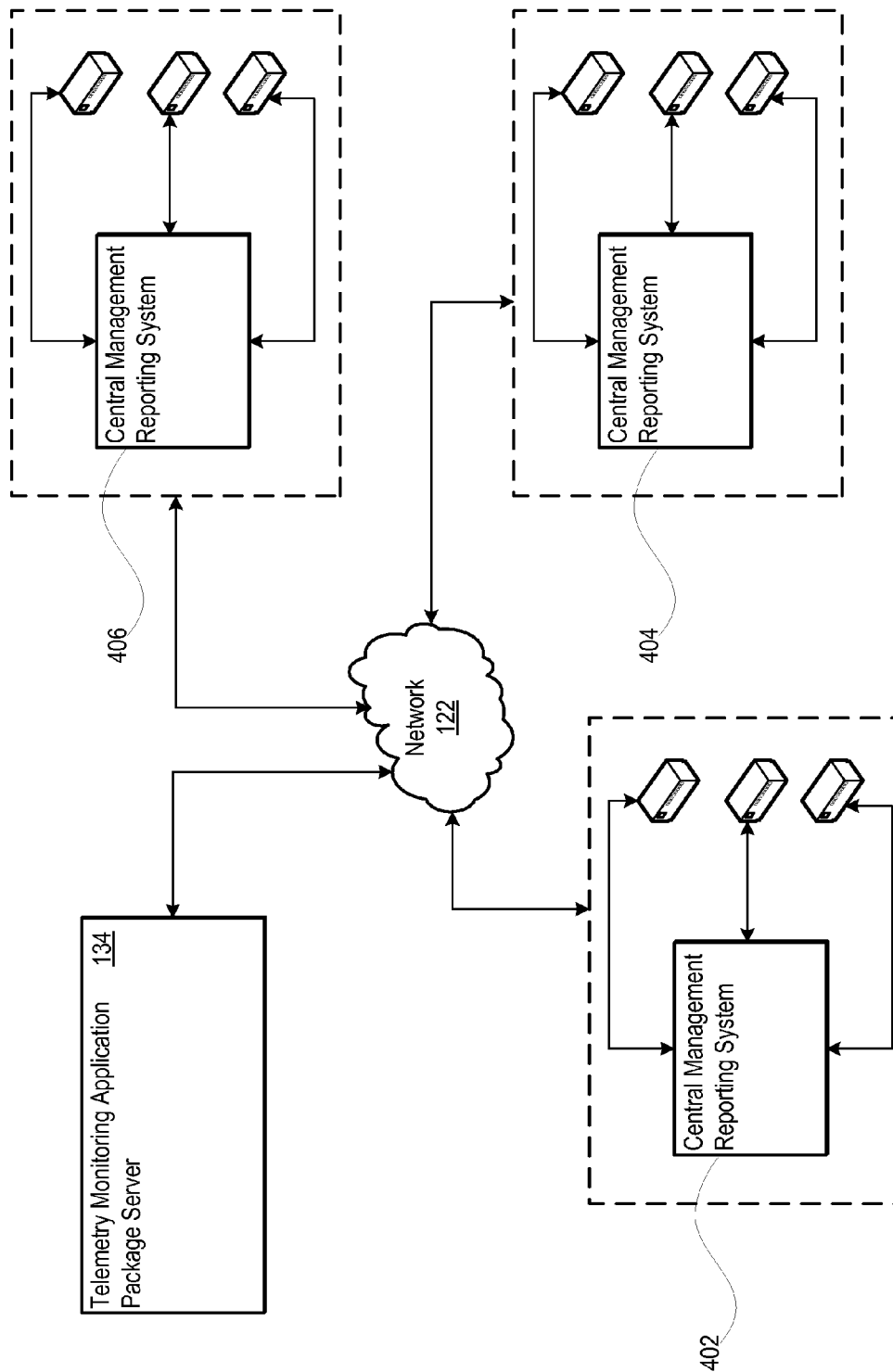
FIG. 4 illustrates an example of multiple central management reporting systems in communication with a telemetry monitoring application package server according to aspects of the disclosure.

The telemetry monitoring application package server 134 may also have different versions of the same telemetry monitoring application package because a particular version of a telemetry monitoring application or particular version of firmware for the corresponding telemetry sensor controller may be authorized for one central management reporting system but not authorized for another central management reporting system. FIG. 4 illustrates an example of this situation.

As shown in FIG. 4, three separate central management reporting systems 402-406 may be in communication with the telemetry monitoring application package server 134. In this example, each of the central management reporting systems 402-406 may be in communication with their own respective telemetry sensor controllers, communication hubs, equipment being monitored, client devices etc. Moreover, the central management reporting system 402-406 may have the same type of telemetry sensor controllers. However, the operator of the first central management reporting system 402 may have decided not to authorize a version of the telemetry monitoring application (e.g., version 1.2 or other version number) to be installed on the first central management reporting system 402, but the operator of the second central management reporting system 404 may have authorized this version (e.g., version 1.2) to be installed on the second central management reporting system 404. In this example, the telemetry monitoring application package server 134 may maintain a first telemetry monitoring application package for the first central management reporting system 402 and a second telemetry monitoring application package for the second central management reporting system 404, where each telemetry monitoring application package has a different version of the same telemetry monitoring application.

As another example, an operator may have custom-designed a telemetry monitoring application and/or a corresponding firmware. In this regard, the telemetry monitoring application may maintain a telemetry monitoring application package containing the custom-designed telemetry monitoring application and/or custom-designed firmware.

The central management reporting system 104 may retrieve telemetry application packages from the telemetry monitoring application package server 134 based on differences in the telemetry monitoring application versions, firmware versions, or combinations thereof. For example, the central management reporting system 104 may request telemetry monitoring application version numbers, firmware version numbers, or combinations thereof, and compare the requested version numbers with the version numbers of the corresponding telemetry monitoring applications, firmwares, or combinations thereof, residing on the central management reporting system 104. Moreover, one or more version identifiers (e.g., a version number for a telemetry monitoring application, a version number for a firmware, etc.) may be associated with an equipment identifier for a telemetry sensor controller such that the proxy reporting application 306 may identify whether there are updates for specific types of telemetry sensor controllers.

In one example, the central management reporting system 104 may request the various version numbers from the telemetry monitoring application package server 134 at predetermined time intervals (e.g., once a week, once a month, every day, etc.). The central management reporting system 104 may also request the various version numbers from the telemetry monitoring application package server 134 upon the occurrence of a given event, such as when the central management reporting system 104 is first powered on or a telemetry sensor controller is first to the central management reporting system 104. Combinations of the foregoing are also possible.

When the central management reporting system 104 identifies that a telemetry monitoring application and/or firmware has been updated (e.g., the associated version number indicates a newer version of the telemetry monitoring application and/or firmware), the central management reporting system 104 may request one or more telemetry monitoring application packages corresponding to the update telemetry monitoring application and/or updated firmware.

Figure 5:
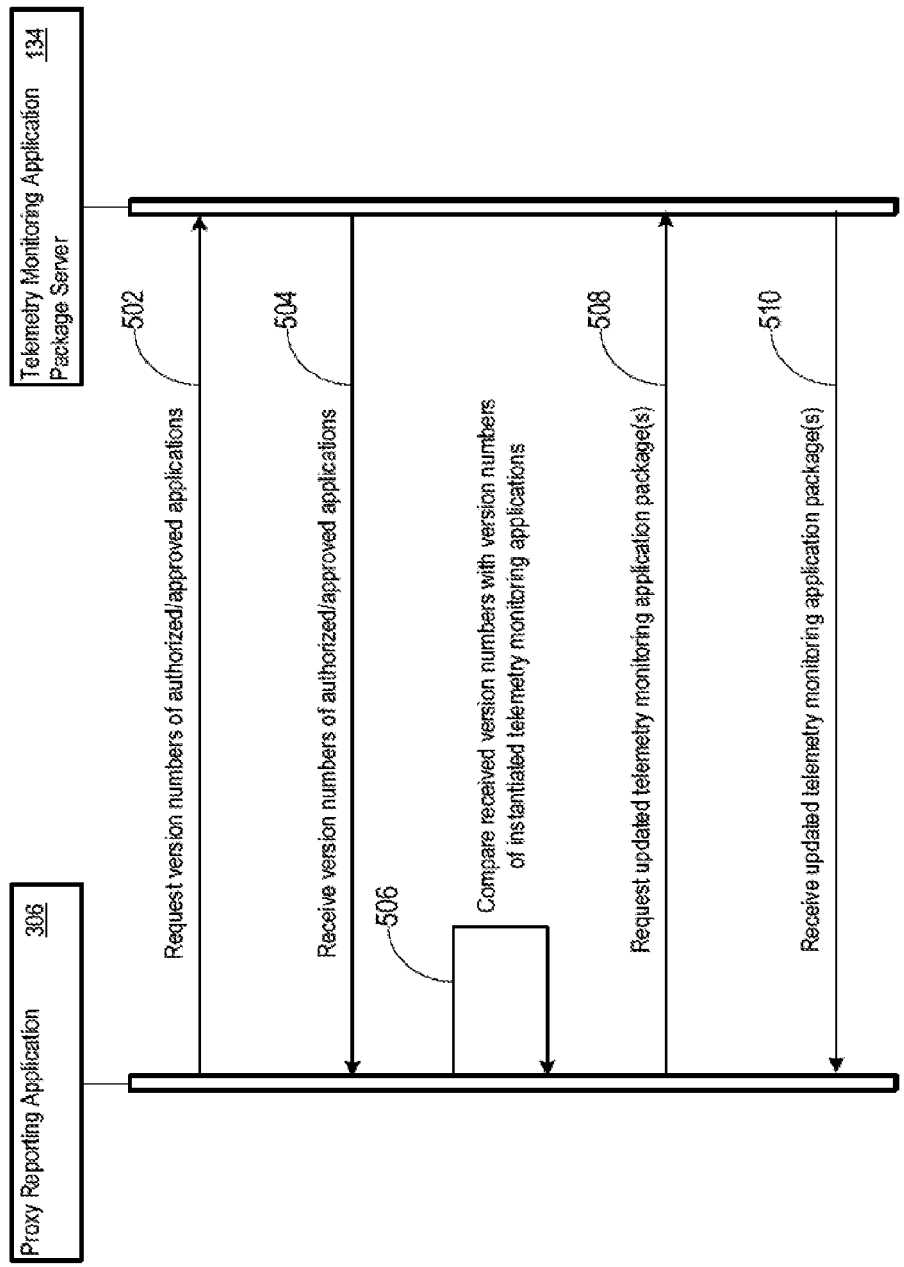
FIG. 5 illustrates an example of messages that may be passed between a proxy reporting application executed by the central management reporting system and a telemetry monitoring application package server according to aspects of the disclosure.

FIG. 5 illustrates an example of messages that may be communicated between the central management reporting system 104 and the telemetry monitoring application package sever 134 during an update. Initially, the proxy reporting application 306 may request version numbers of authorized or approved telemetry monitoring applications and/or firmwares from the telemetry monitoring application package server 134 (Message 502) (recall from FIG. 4 that a select version of a telemetry monitoring application and/or firmware may not be approved or authorized for loading onto the central management reporting system 104). In reply, the telemetry monitoring application package server 134 may transmit one or more versions of the telemetry monitoring applications and/or firmwares authorized to be loaded onto the central management reporting system 104 (Message 504).

The proxy reporting application 306 may then compare the received version numbers with the version numbers of the telemetry monitoring applications and/or firmwares residing on the central management reporting system 104 (Operation 506). When the proxy reporting application 306 identifies an updated telemetry monitoring application and/or firmware (e.g., the associated received version number indicates a newer version of the telemetry monitoring application and/or firmware), the proxy reporting application 306 may request the telemetry monitoring application package corresponding to the updated telemetry monitoring application and/or firmware (Message 508). In reply, the telemetry monitoring application package server 134 may then transmit the updated telemetry monitoring application packages, which may include the updated telemetry monitoring application and/or updated firmware (Message 510).

In this manner, the telemetry monitoring application package server 134 facilitates the distribution of telemetry monitoring application packages to one or more central management reporting systems. Moreover, because the updated telemetry monitoring application packages may reside on the telemetry monitoring application package server 134, the central management reporting system 104 need not waste resources (e.g., storage capacity, processor cycles, memory capacity, etc.) on storing unnecessary or unneeded telemetry monitoring application packages (e.g., an updated telemetry monitoring application package for one central management reporting system may not be authorized or approved for another central management reporting system).

When the proxy reporting application 306 receives an updated telemetry monitoring application package, the proxy reporting application 306 may first determine whether the updated telemetry monitoring application package includes updated firmware for a telemetry sensor controller, an updated telemetry monitoring application, or both.

When the updated telemetry monitoring application package includes an updated telemetry monitoring application, the proxy reporting application 306 may perform one or more telemetry monitoring application update operations. In one example, such operations may include terminating the currently executing telemetry monitoring application and then replacing the now-terminated telemetry monitoring application with the updated telemetry monitoring application. Replacing the now-terminated telemetry monitoring application may include deleting or otherwise overwriting the now-terminated telemetry monitoring application with the updated telemetry monitoring application. The proxy reporting application 306 may then instantiate the updated telemetry monitoring application according to the aspects disclosed herein. Alternatively, the proxy reporting application 306 may identify the telemetry sensor controller corresponding to the updated telemetry monitoring application as an orphaned telemetry sensor controller, in which case, the proxy reporting application 306 may then instantiate the updated telemetry monitoring application according to the aspects disclosed herein.

In addition, when an updated telemetry monitoring application is detected, one or more of the telemetry sensor controllers may be reset. For example, when an updated telemetry monitoring application is detected, a telemetry sensor controller may be reset to a known state so that changes and/or settings from the prior telemetry monitoring application are not carried over to the updated telemetry monitoring application. This reset procedure may ensure that the telemetry sensor controller will operate as tested, and operate using firmware and settings that were tested with the updated telemetry monitoring application.

The procedure for updating the firmware on a telemetry sensor controller may differ from updating a telemetry monitoring application. This procedure may differ because the updated firmware may cause a failure in the telemetry sensor controller, and the operator of the telemetry sensor controller may desire to know of the failure before distributing the updated firmware to other telemetry sensor controllers. Where there are multiple telemetry sensor controllers of the same type in communication with the central management reporting system 104, updating the firmware for the same type of telemetry sensor controllers may include replacing the older firmware on a first telemetry sensor controller with the updated firmware, confirming that the first telemetry sensor controller is operating within expected parameters (e.g., the telemetry sensor controller does not report a malfunction), and then updating a second telemetry sensor controller, a third telemetry sensor controller, and so forth in a manner similar to updating the first telemetry sensor controller (e.g., confirming that the given telemetry sensor controller is operating within expected parameters before updating the next telemetry sensor controller).

In one example, the proxy reporting application 306 may first instruct a select telemetry monitoring application corresponding to the telemetry sensor controller associated with the updated firmware to load the updated firmware into the associated telemetry sensor controller. Where there are multiple types of the same telemetry sensor controller in communication with the proxy reporting application 306, the proxy reporting application 306 may select one at random for updating and further monitoring. Alternatively, a select telemetry sensor controller may be identified as a "test subject," such that, were the updated firmware to cause the telemetry sensor controller to fail, the failure would not be a critical one.

After loading the updated firmware into the selected telemetry sensor controller, the proxy reporting application 306 may then terminate the corresponding telemetry monitoring application. Where there is an updated telemetry monitoring application in the received telemetry monitoring application package, the proxy reporting application 306 may also update the telemetry monitoring application according to the aspects disclosed herein.

In yet another implementation, when a telemetry monitoring application is instantiated, the telemetry monitoring application may compare the firmware running on the corresponding telemetry sensor controller with firmware stored in a corresponding telemetry monitoring application package. Based on this comparison, the firmware on the corresponding telemetry sensor controller may be updated, and then the telemetry monitoring application may continue operating.

The proxy reporting application 306 may then monitor the status of the telemetry sensor controller via the telemetry monitoring application. For example, the proxy reporting application 306 may request the status of the updated telemetry sensor controller at predetermined time intervals. Examples of predetermined time intervals include every thirty seconds, every five minutes, every hour, or at any other time interval. The proxy reporting application 306 may continue to check on the status of the telemetry sensor controller with the updated firmware for a predetermined length of time, such as an hour, a day, thirty minutes, or any other predetermined length of time. When the predetermined length of time has expired and the telemetry monitoring application did not indicate a malfunction in the updated telemetry sensor controller, the proxy reporting application 306 may determine that the firmware update of the telemetry sensor controller was successful.

When the firmware update of the initial telemetry sensor controller is successful, the proxy reporting application 306 may continue updating other telemetry sensor controllers of the same type as the initially updated telemetry sensor controller. For example, where there are multiple telemetry sensor controllers of the same type in communication with the central management reporting system 104, the proxy reporting application 306 may select a first telemetry sensor controller for updating, update the firmware of the first telemetry sensor controller, wait for a determination that the update of the first telemetry sensor controller was a success, then select a second telemetry sensor controller for updating, update the second telemetry sensor controller, and so forth. In this manner, the proxy reporting application 306 may update telemetry sensor controllers on an individual basis to confirm that a particular telemetry sensor controller did not experience a malfunction with the updated firmware.

While the proxy reporting application 306 may be configured to check on the status of a telemetry sensor controller after updated firmware has been transferred to the telemetry sensor controller, the proxy reporting application 306 may be further configured to check on the status of one or more telemetry sensor controllers when the one or more telemetry sensor controllers are connected with (e.g., directly or indirectly), with the central management reporting system 104. For example, when a telemetry sensor controller is connected to the central management reporting system 104, the proxy reporting application 306 may be configured to request status updates from the corresponding telemetry monitoring application in communication with the telemetry sensor controller at predetermined time intervals. Examples of predetermined time intervals may include every thirty seconds, every five minutes, or any other time interval. One example of a status check that the telemetry monitoring application may perform is that the telemetry monitoring application may "ping" the telemetry sensor controller and wait for a response to the ping.

Another example of a status check that the telemetry monitoring application may perform is that the telemetry monitoring application may request operational parameter values from the telemetry sensor controller (e.g., operational temperature, read/write status, connected sensor status, etc.). The telemetry monitoring application and/or proxy reporting application 306 may compare the operational parameter values received from the telemetry sensor controller with expected operational parameter values (e.g., operational parameter values that are known to indicate a correctly functioning telemetry sensor controller) to determine whether the telemetry sensor controller is operated as expected.

When a failure or malfunction is detected in a telemetry sensor controller, the proxy reporting application 306 may initiate a recovery procedure in an attempt to re-establish communications with the failed or malfunctioning telemetry sensor controller. In one example, the proxy reporting application 306 may request a telemetry monitoring application package that contains an authorized version of firmware known to be "stable" or one known not to cause problems with the failed or malfunctioning telemetry sensor controller. The proxy reporting application 306 may then attempt to replace the firmware installed on the failed or malfunctioning telemetry sensor controller with the stable firmware.

In another example, the proxy reporting application 306 may terminate and re-instantiate the telemetry monitoring application corresponding to the failing or malfunctioning telemetry sensor controller in an attempt to re-establish communications between the telemetry monitoring application and the failing or malfunctioning telemetry sensor controller. Further still, the proxy reporting application 306 may send an error message to a client device or user of the central management reporting system 104 and inform the client device or user that the telemetry sensor controller is experiencing a failure or malfunction. Moreover, the proxy reporting application 306 may perform any combination of the foregoing recovery procedures.

Although the foregoing may apply to the central management reporting system 104, the disclosed updating procedures (i.e., the firmware updating procedure and/or the telemetry monitoring application updating procedure) may also apply to multiple central management reporting systems. For example, referring to FIG. 4, the foregoing updating procedures may apply to each of the central management reporting systems 402-406. Where multiple central management reporting systems 402-406 are involved, the deployment of one or more telemetry application packages from the telemetry application package server 134 may be monitored. Monitoring the deployment of the one or more telemetry monitoring application packages may include monitoring the number of successful installations of the deployed one or more telemetry monitoring application packages, the number of failures of the deployed one or more telemetry monitoring application packages, the number of correctly functioning telemetry sensor controllers based on the deployed telemetry monitoring application packages, and so forth.

The monitoring of the deployment of the telemetry monitoring application packages may affect how current or future telemetry monitoring application packages are deployed. For example, if the monitoring indicates that there is a high rate of failure in deploying the telemetry monitoring application packages, the rate at which telemetry monitoring application packages are deployed may be reduced. Conversely, if the monitoring indicates there is a high rate of success in deploying the telemetry monitoring application packages, the rate at which the telemetry monitoring application packages are deployed may be increased. As yet another example, where there is a non-acceptable level of failure in the rate of deployed telemetry monitoring application packages, the version of the deployed telemetry monitoring application packages may be reverted to a version known to have a higher rate of success. Thus, by monitoring various metrics in the deployment of one or more telemetry monitoring application packages, the rate of deployment, the rate of adoption, and other such characteristics, may be controlled to prevent systemic failures or other undesirable and large-scale behaviors.

Referring back to FIG. 3, the central management reporting system 104 may also include a requestable operations mapping database 324. The requestable operations mapping database 324 may include associations between one or more telemetry monitoring applications and operations that may be requested by a client device. In one example, a telemetry monitoring application may be associated with one or more operations, and the requestable operations mapping database 324 may be updated based on these associations. Examples of requestable operations may include conducting a test with a telemetry sensor controller (e.g. a battery test, a fan speed test), updating telemetry information received by the telemetry monitoring application, and other such requestable operations.

The requestable operations may be based on the type of telemetry sensor controller managed by a select telemetry monitoring application. For example, the requestable operations for a telemetry sensor controller that monitors a power supply may be different than the requestable operations for a telemetry sensor controller that monitors a rack appliance or storage device.

Further still, the proxy reporting application 306 may instantiate a telemetry monitoring application based on a request to perform one or more of the requestable operations. For example, it is contemplated that a request for a requestable operation may be received after a connection is established with a telemetry sensor controller, but before the corresponding telemetry monitoring application is instantiated. When the request to perform the requestable operation is received and the proxy reporting application 306 determines that a corresponding telemetry monitoring application has not yet been instantiated, the proxy reporting application 306 may then instantiate the corresponding telemetry monitoring application. Thus, it may not be necessary that a telemetry monitoring application is executing at the time a request for a requestable operation is received.

Figure 6:
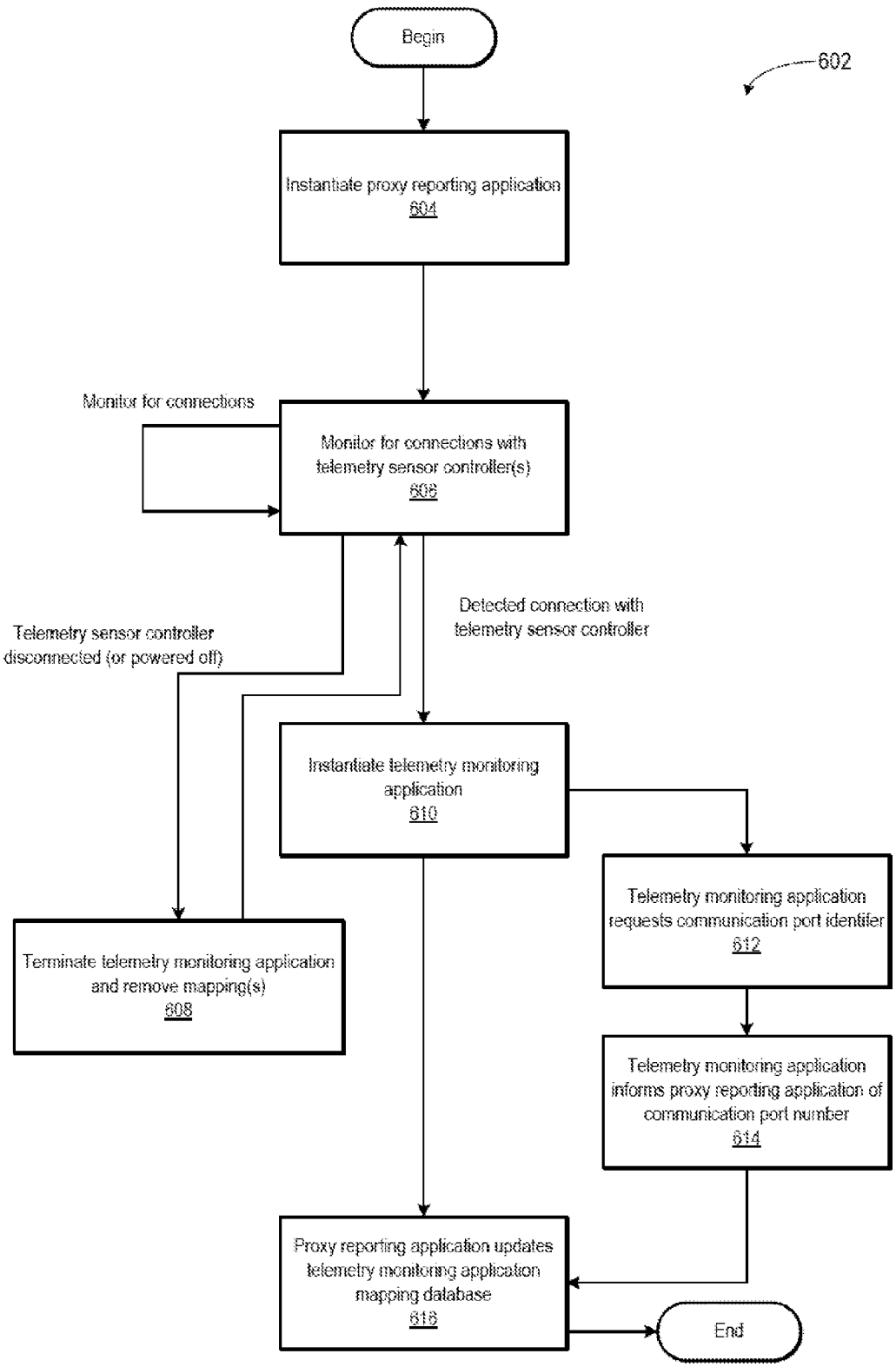
FIG. 6 illustrates an example of logic flow for instantiating a telemetry monitoring application according to aspects of the disclosure.

FIG. 6 illustrates one example of logic flow 602 for instantiating a telemetry monitoring application according to aspects of this disclosure. Initially, the central management reporting system 104 may instantiate the proxy reporting application 306 (Block 604).

The proxy reporting application 306 may then "listen," or monitor, for connections with one or telemetry sensor controllers (Block 606). The proxy reporting application 306 may be notified of a connection with a telemetry sensor controller via a notification process of a computer operating system, such as the enumeration process of identifying USB devices when they are connected to a host computer. The notification process may also notify the proxy reporting application 306 when a telemetry sensor controller is disconnected or powered off. In this instance, the proxy reporting application 306 may terminate one or more telemetry monitoring applications for the disconnected telemetry sensor controller (Block 608).

When a connection with a telemetry sensor controller is established, the proxy reporting application 306 may then instantiate one or more telemetry monitoring applications (Block 610). As discussed above, the proxy reporting application 306 may determine which telemetry monitoring application to instantiate by identifying orphaned telemetry sensor controllers. In other words, the proxy reporting application 306 may determine which telemetry monitoring application to instantiate by comparing communication port identifiers of telemetry sensor controllers in the telemetry sensor controller mapping database 322 with the communication port identifiers associated with telemetry monitoring applications in the telemetry monitoring application mapping database 320. Where a communication port identifier for telemetry sensor controller is in the telemetry sensor controller mapping database 322 but not in the telemetry monitoring application mapping database 320, the proxy reporting application 306 may instantiate the corresponding telemetry monitoring application by referring to the equipment identifier database 318 with the equipment identifier of the one or more orphaned telemetry sensor controllers.

The one or more telemetry monitoring applications may then request one or more communication port identifiers, such as by requesting one or more communication port numbers from the port assignment application 308 (Block 612). The one or more telemetry monitoring applications may then inform the proxy reporting application 306 of the one or more communication port identifiers assigned to the telemetry monitoring application (Block 614). The one or more telemetry monitoring applications may also inform the proxy reporting application 306 of other communication identifiers, such as the communication port identifier assigned to the telemetry to which the monitored equipment is connected.

Based on the received communication identifiers, the proxy reporting application 306 may then update the telemetry monitoring application mapping database 320 (Block 616). The proxy reporting application 306 may also update the telemetry monitoring application mapping database 320 based on the instantiation of a telemetry monitoring application and associating the instantiated telemetry monitoring application with the communication port identifier of its corresponding telemetry sensor controller.

Although the logic flow 602 illustrates the logic flow to be continuous from various logic blocks (e.g., Blocks 604-610), it should be understood that the operations for these blocks may be performed continuously while other operations are being performed within other logic blocks (e.g., Blocks 612-614). Thus, the proxy reporting application 306 may continuously monitor for connections with other telemetry sensor controllers while associating communication port identifiers to telemetry monitoring applications that were previously instantiated.

Figure 7A:
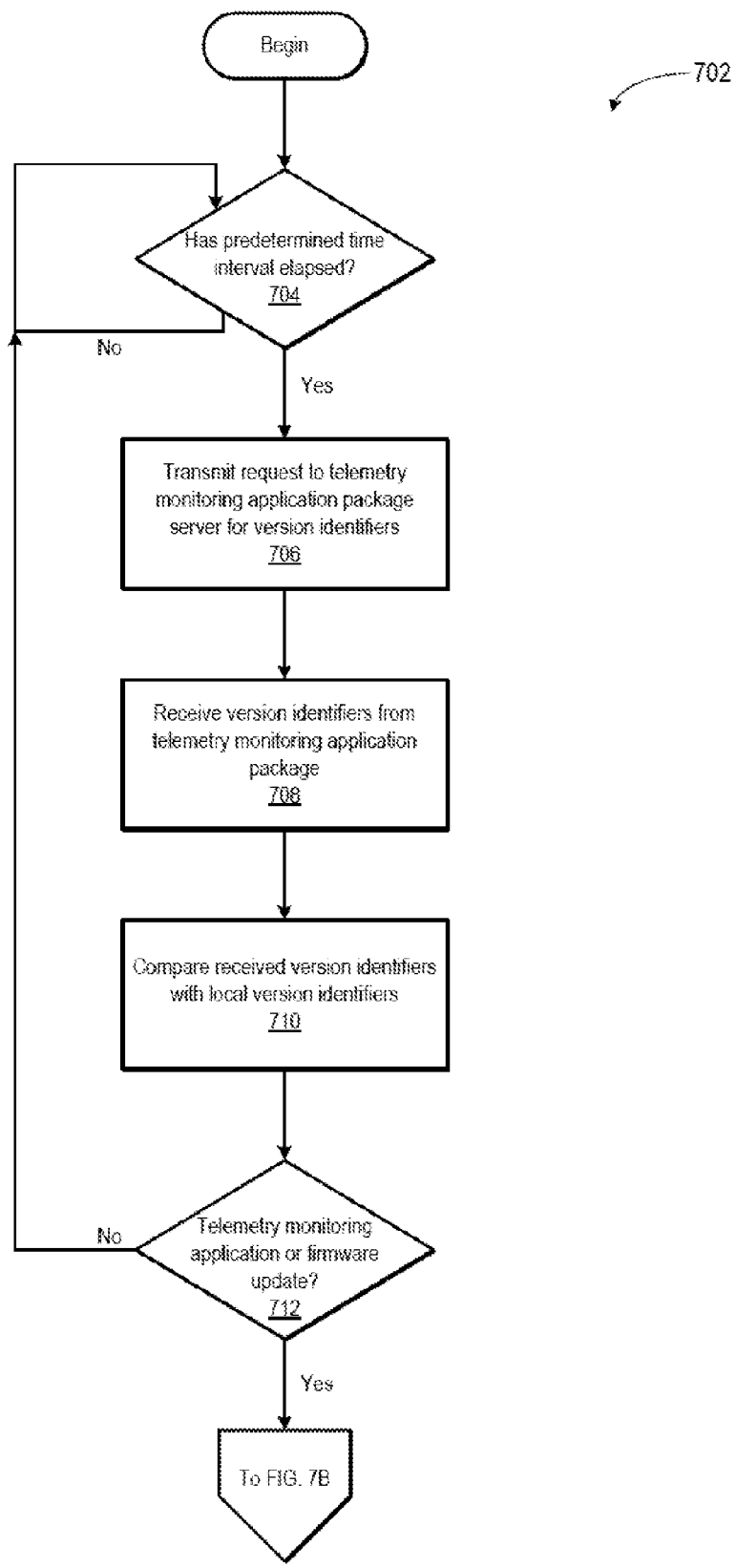
FIGS. 7A-7C illustrate an example of logic flow for updating a telemetry monitoring application and/or firmware for a telemetry sensor controller according to aspects of the disclosure.
Figure 7B:
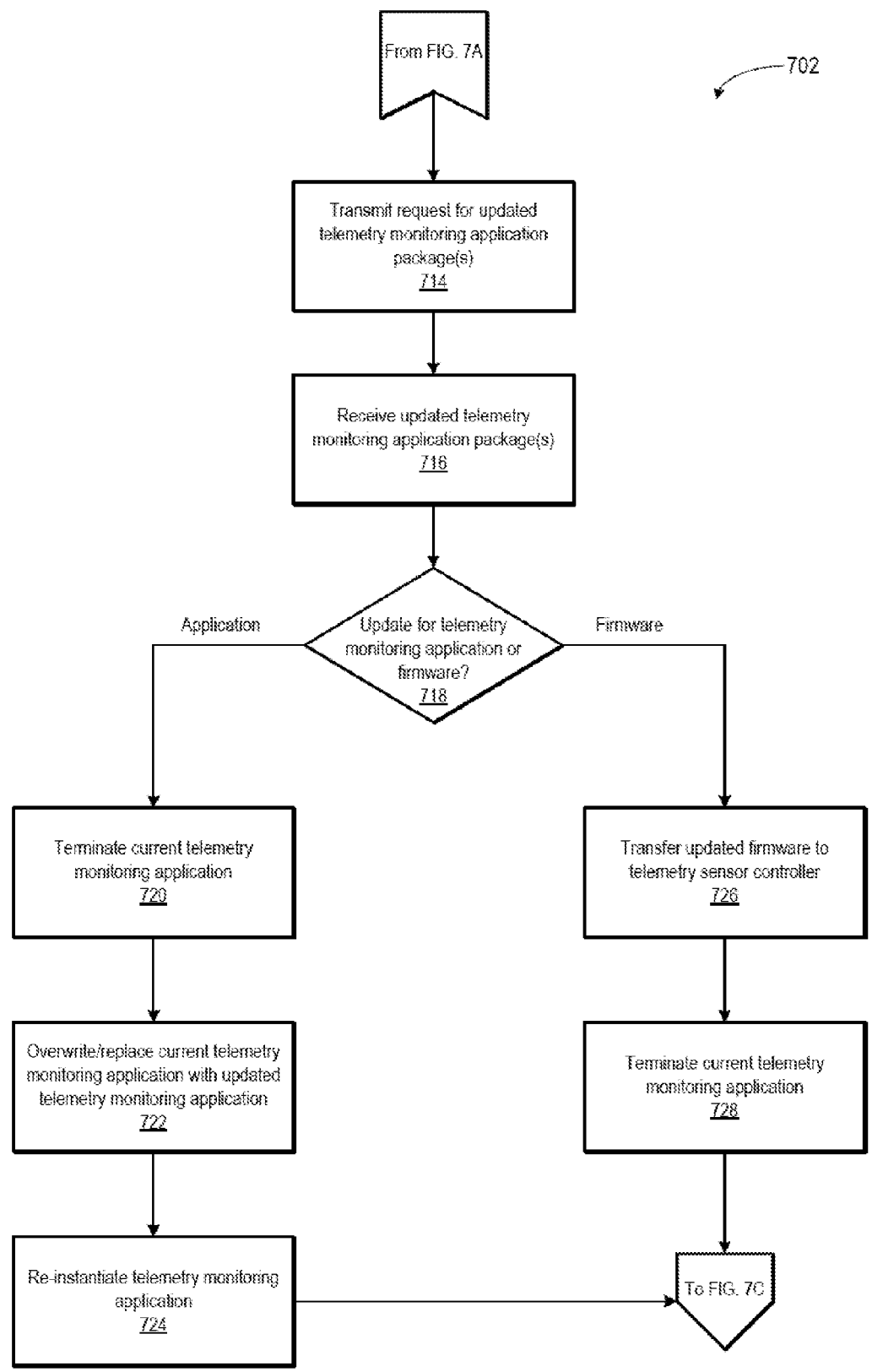
Figure 7C:
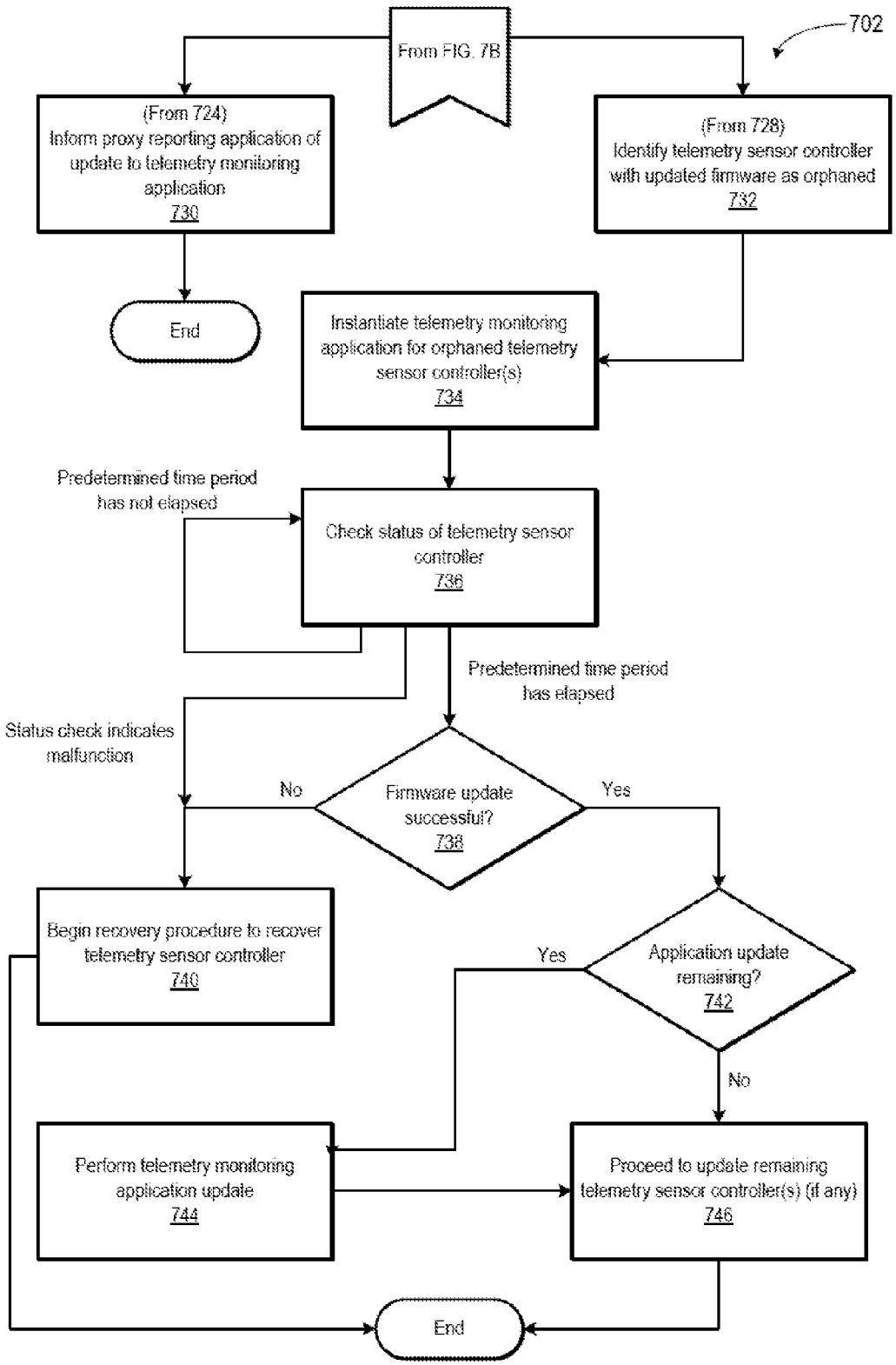

FIGS. 7A-7C illustrate an example of logic flow 702 for updating a telemetry monitoring application and/or firmware for a telemetry sensor controller according to aspects of the disclosure. Initially, the proxy reporting application 306 may determine whether a predetermined time period has elapsed for checking whether one or more updated telemetry monitoring applications or firmwares are available (Block 704). As discussed previously, the predetermined time period may be every hour, one or more times during the day, one or more times during the week, or any other amount of time. Additionally, the proxy reporting application 306 may perform a check for updated telemetry monitoring applications or updated firmwares at the occurrence of an event, such as at the connection of a telemetry sensor controller.

The proxy reporting application 306 may then transmit a request to the telemetry application package server 134 for a list of version identifiers that each identify the authorized (or unauthorized) version of a telemetry monitoring application executing on the central management reporting system 104 or a version of a firmware for a telemetry sensor controller in communication with the central management reporting system 104 (Block 706). Accordingly, the proxy reporting application 306 may receive the list of version identifiers (Block 708).

The proxy reporting application 306 may next determine whether there is an updated telemetry monitoring application or firmware available (Block 712). In one example, the proxy reporting application 306 may compare the received version identifiers with the version identifiers of the telemetry monitoring applications residing (or executing) on the central management reporting system 104 and/or the version identifiers of the firmware for the telemetry sensor controller(s) in communication with the central management reporting system 104. The proxy reporting application 306 may determine that an update is available when a received version identifier is different than a local version identifier. In one example, the received version identifier may be a higher number (e.g., 1.2, 1.3, 2.1, etc.) than the local version identifier (e.g., 0.8, 1.0, 1.1, etc.).

Referring to FIG. 7B, when the proxy reporting application 306 determines that an update is available for one or more telemetry monitoring applications and/or one or more firmwares, the proxy reporting application 306 may transmit a request for the telemetry monitoring application packages corresponding to the updated one or more telemetry monitoring applications and/or updated one or more firmwares (Block 714). Accordingly, the proxy reporting application 306 may receive the updated telemetry monitoring application packages (Block 716).

The proxy reporting application 306 may then determine whether a telemetry monitoring application is to be updated or a firmware is to be updated (Block 718). In one example, when an updated telemetry monitoring application package includes an update for both a telemetry monitoring application and a firmware, the proxy reporting application 306 may first follow the update procedure for the firmware. In another example, the proxy reporting application 306 may first follow the update procedure for the telemetry monitoring application.

In updating the telemetry monitoring application, the proxy reporting application 306 may terminate the local telemetry monitoring application if the local telemetry monitoring application is running (Block 720). Thereafter, the proxy reporting application 306 may replace the local telemetry monitoring application with the updated telemetry monitoring application, such as by deleting or overwriting the local telemetry monitoring application (Block 722). The proxy reporting application 306 may then re-instantiate the telemetry monitoring application (Block 724). Referring briefly to FIG. 7C, the proxy reporting application 306 may then wait for a communication from the updated telemetry monitoring application that the update was successful (Block 730). However, it is also possible that such a communication is not transmitted to the proxy reporting application 306 and that the proxy reporting application 306 may proceed under the assumption that the update was successful. In the event that the update was not successful, the proxy reporting application 306 may initiate a recovery procedure as previously discussed (e.g., reverting to a former, stable version of the telemetry monitoring application, notifying an operator of the update failure, etc.).

Referring back to FIG. 7B, where the telemetry monitoring application package includes an updated firmware for one or more telemetry sensor controllers, the proxy reporting application 306 may first select telemetry sensor controller for updating. To remind the reader, multiple telemetry sensor controllers of the same type may be in communication with the central management reporting system 104, and the firmware update may be intended for each of the telemetry sensor controllers. However, to prevent a mass failure, the proxy reporting application 306 may first select a single telemetry sensor controller to update.

The proxy reporting application 306 may then transfer the updated firmware to the select telemetry sensor controller (Block 726), and then terminate the corresponding telemetry monitoring application (Block 728). It is also contemplated that the telemetry monitoring application may not be terminated.

Referring to FIG. 7C, the proxy reporting application 306 may then re-instantiate the telemetry monitoring application for the firmware updated telemetry sensor controller. The proxy reporting application 306 may also identify the firmware updated telemetry sensor controller as an orphaned telemetry sensor controller (Block 732), in which case, the proxy reporting application 306 may re-instantiate the telemetry monitoring application as discussed previously (Block 734).

Thereafter, the proxy reporting application 306 may conduct status checks on the telemetry sensor controller (Block 736). In one example, the proxy reporting application 306 may instruct the corresponding telemetry monitoring application to "ping" the telemetry sensor controller. Should the telemetry sensor controller send a reply, the proxy reporting application 306 may presume that the firmware update was successful.

In another example, the proxy reporting application 306 may conduct one or more status checks on the firmware updated telemetry sensor controller over a predetermined time period. For example, the proxy reporting application 306 may conduct one or more status checks on the firmware updated telemetry sensor controller over a period of a minute, five minutes, a day, a week, or any other period of time.

In one example, a status check indicating a failure may cause the proxy reporting application 306 to initiate a recovery procedure to re-establish communications with the firmware updated telemetry sensor controller (Block 740). In another example, the proxy reporting application 306 may wait until the predetermine time period has expired, and then determine whether the firmware update was successful (Block 738). Where the proxy reporting application 306 waits until the predetermined time period has expired, the proxy reporting application 306 may determine that the firmware update was successful if a threshold number of status checks indicated that the firmware updated telemetry sensor controller was operating within expected parameters. A threshold number of status checks may be a majority of status checks (e.g., 50% of status checks) or any other number of status checks.

Should the firmware update be successful, the proxy reporting application 306 may then determine whether there is an update for the corresponding telemetry monitoring application (Block 742). Where such an update is available, the proxy reporting application may perform the update of the telemetry monitoring application as previously discussed (Block 744). The proxy reporting application 306 may then proceed to update the next telemetry sensor controller with the firmware.

Accordingly, this disclosure provides for a central management reporting system 104 operative to establish communications with various types of telemetry sensor controllers and to manage the operations of the telemetry sensor controllers. Furthermore, the central management reporting system 104 may provide a central communication interface (e.g., the proxy reporting application 306) through which one or more client devices may request telemetry information from the telemetry sensor controllers in communication with the central management reporting system 104. In addition, the central management reporting system 104 may be configured to update software and/or firmware for the telemetry sensor controllers, but to do so in a way that minimizes the risk of a mass failure. As a firmware update or software update may have unexpected consequences, the central management reporting system 104 may individually update one or more telemetry sensor controllers for which a firmware update is available.

Moreover, since the telemetry sensor controllers in communication with the central management reporting system 104 may be identified by a communication port identifier associated with a physical location, the central management reporting system 104 facilitates the rapid deployment of technicians to repair a select telemetry sensor controller (or equipment being monitored by the telemetry sensor controller) when the telemetry sensor controller indicates a potential operating deviation. Thus, the central management reporting system 104 represents a technological advancement in the deployment and monitoring of equipment when a rapid response is needed at the first sign of potential equipment failure.

As these and other variations and combinations of the features discussed above can be utilized without departing from the subject matter as defined by the claims, the foregoing description should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus for managing telemetry sensor controllers, the apparatus comprising:
   a memory operative to store:
      an equipment identifier mapping that associates a first equipment identifier with a first telemetry monitoring application, and
      an operation mapping that comprises an association between at least one requestable operation and at least one telemetry monitoring application; and
   a processor in communication with the memory and configured to:
      detect a connection with a first telemetry sensor controller;
      receive the first equipment identifier from the first telemetry sensor controller;
      establish a first telemetry sensor controller mapping in the memory for the first telemetry sensor controller, wherein the first telemetry sensor controller mapping is based on the first equipment identifier and a first communication port identifier for a communication port to which the first telemetry sensor controller is connected;

instantiate the first telemetry monitoring application for managing the first telemetry sensor controller based on an association of the first telemetry monitoring application with the first equipment identifier, wherein the first telemetry monitoring application is operable to instruct the first telemetry sensor controller to perform a first requestable operation;

receive a request from a client device to perform a second requestable operation;

instantiate the second telemetry monitoring application associated with the second requestable operation in the operation mapping; and perform the second requestable operation with a second connected telemetry sensor controller managed by the second telemetry monitoring application.

2. The apparatus of claim 1, wherein the processor is further configured to:

receive a second equipment identifier for a second telemetry sensor controller;

identify the second telemetry sensor controller as an orphaned telemetry sensor controller when on a comparison of the second equipment identifier with at least one telemetry monitoring application mapping of a plurality of telemetry monitoring application mappings stored in the memory indicates that the second equipment identifier is not included in the plurality of telemetry monitoring application mappings; and instantiate a second telemetry monitoring application for the second telemetry sensor controller when the second telemetry sensor controller is identified as the orphaned telemetry sensor controller.

3. The apparatus of claim 1, wherein the processor is further configured to:

request the first telemetry monitoring application to check a status of the first telemetry sensor controller; and initiate a recovery procedure to recover a connection with the first telemetry sensor controller when the status of the first telemetry sensor controller indicates a problem.

4. The apparatus of claim 1, wherein:

the memory further stores an operation mapping that comprises an association between a requestable operation and the first telemetry monitoring application; and, the processor is further configured to:

receive a request from a client device to perform the requestable operation; and instruct the first telemetry monitoring application to perform the requestable operation with the first telemetry sensor controller.

5. The apparatus of claim 1, wherein the first telemetry monitoring application is further operable to:

automatically determine a firmware version installed on the first telemetry sensor controller; and automatically transfer firmware to the first telemetry sensor controller when the determined firmware version installed on the first telemetry sensor controller is determined to not be a current version of the firmware available for the first telemetry sensor controller.

6. The apparatus of claim 1, wherein the equipment identifier comprises a vendor identifier and a product identifier.

7. An apparatus for managing telemetry sensor controllers, the apparatus comprising:

a telemetry sensor controller connected to a communication port; and a central management system in communication with the telemetry sensor controller, the central management system comprising:

a memory that is operative to store:

a telemetry sensor controller mapping that associates a telemetry monitoring application assignable to the telemetry sensor controller with a telemetry sensor controller type, and an operation mapping that comprises an association between at least one requestable operation and at least one telemetry monitoring application; and a processor in communication with the memory and configured to:

identify a telemetry sensor controller type of the telemetry sensor controller;

instantiate the telemetry monitoring application based on the identified telemetry sensor controller type;

assign the telemetry monitoring application to the telemetry sensor controller, wherein the communication port to which the telemetry sensor controller is connected is associated with the telemetry monitoring application;

receive telemetry information from the telemetry sensor controller based on communications between the telemetry monitoring application and the telemetry sensor controller;

provide at least one requestable operation for the telemetry sensor controller to perform, wherein the at least one requestable operation is associated with the identified telemetry sensor controller type in the telemetry sensor controller mapping;

receive a request for the at least one requestable operation; and perform the requestable operation with the telemetry sensor controller by informing the telemetry monitoring application associated with the requestable operation in the operation mapping that the at least one requestable operation was requested.

8. The apparatus of claim 7, wherein the processor is further configured to instruct the telemetry monitoring application to provide a status update on the telemetry sensor controller, the status update indicating whether the telemetry monitoring application is communicating with the telemetry sensor controller.

9. The apparatus of claim 7, wherein the central management system is one central management system of a plurality of central management systems, and further comprising:

a telemetry application package server in communication with the plurality of central management systems, the telemetry application package server configured to:

store a telemetry application package for deployment to the plurality of central management systems;

deploy the telemetry application package to the plurality of central management systems;

monitor a deployment rate at which the telemetry application package is deployed to the plurality of central management systems; and adjust the deployment rate based on a number of successful deployments of the telemetry application package.

10. The apparatus of claim 9, wherein the telemetry application package server is configured to adjust the deployment rate by increasing the deployment rate when the number of successful deployments of the telemetry application package exceeds a predetermined threshold rate.

11. The apparatus of claim 9, wherein the telemetry application package server is configured to control versioning of the telemetry application package based on the number of successful deployments of the telemetry application package.

12. A method for managing telemetry sensor controllers, the method comprising:
  detecting, with a processor, a connection with a first telemetry sensor controller;
  receiving, with the processor, a first equipment identifier from the first telemetry sensor controller;
  establishing a first telemetry sensor controller mapping in a computer-readable memory for the first telemetry sensor controller, wherein the first telemetry sensor controller mapping is based on the first equipment identifier and a first communication port identifier for a communication port to which the first telemetry sensor controller is connected;
  instantiating, with the processor, the first telemetry monitoring application for managing the first telemetry sensor controller based on an association of the first telemetry monitoring application with a first equipment identifier, wherein:
  the first equipment identifier is associated with the first telemetry monitoring application based on an equipment identifier mapping stored in the computer-readable memory; and
  the first telemetry monitoring application is operable to instruct the first telemetry sensor controller to perform a first requestable operation;
  receiving, with the processor, a request from a client device to perform a second requestable operation, wherein:
  the second requestable operation is associated with a second telemetry monitoring application in an operation mapping stored in the computer-readable memory;
  instantiating, with the processor, the second telemetry monitoring application associated with the second requestable operation in the operation mapping; and
  performing, with the processor, the second requestable operation with a second connected telemetry sensor controller managed by the second telemetry monitoring application.

13. The method of claim 12, further comprising:
  receiving a second equipment identifier for a second telemetry sensor controller;
  identifying the second telemetry sensor controller as an orphaned telemetry sensor controller when on a comparison of the second equipment identifier with at least one telemetry monitoring application mapping of a plurality of telemetry monitoring application mappings stored in the computer-readable memory indicates that the second equipment identifier is not included in the plurality of telemetry monitoring application mappings; and
  instantiating, with the processor, a second telemetry monitoring application for the second telemetry sensor controller when the second telemetry sensor controller is identified as the orphaned telemetry sensor controller.

14. The method of claim 12, further comprising:
  requesting the first telemetry monitoring application to check a status of the first telemetry sensor controller; and
  initiating a recovery procedure to recover a connection with the first telemetry sensor controller when the status of the first telemetry sensor controller indicates a problem.

15. The method of claim 12, further comprising:
  receiving a request from a client device to perform a requestable operation, wherein:
  the requestable operation is based on an operation mapping stored in the computer-readable memory; and
  the operation mapping comprises an association between the requestable operation and the first telemetry monitoring application; and
  instructing the first telemetry monitoring application to perform the requestable operation with the first telemetry sensor controller.

16. The method of claim 12, further comprising:
  automatically determining a firmware version installed on the first telemetry sensor controller; and
  automatically transferring firmware to the first telemetry sensor controller when the determined firmware version installed on the first telemetry sensor controller is determined to not be a current version of the firmware available for the first telemetry sensor controller.

17. The method of claim 12, wherein the equipment identifier comprises a vendor identifier and a product identifier.

18. A method for managing telemetry sensor controllers, the method comprising:
  identifying, with a processor, a telemetry sensor controller type of a telemetry sensor controller connected to a communication port;
  instantiating, with the processor, a telemetry monitoring application based on the identified telemetry sensor controller type;
  assigning the telemetry monitoring application to the telemetry sensor controller, wherein the communication port to which the telemetry sensor controller is connected is associated with the telemetry monitoring application;
  receiving telemetry information from the telemetry sensor controller based on communications between the telemetry monitoring application and the telemetry sensor controller;
  receiving a request for at least one requestable operation, wherein the at least one requestable operation is based on the identified telemetry sensor controller type; and
  performing the requestable operation with the telemetry sensor controller by informing the telemetry monitoring application that the at least one requestable operation was requested;
  wherein the telemetry monitoring application is associated with the telemetry sensor controller type in a telemetry sensor controller mapping and further is associated with the requestable operation in an operation mapping, the telemetry sensor controller mapping and the operation mapping being stored in a computer-readable memory.

19. The method of claim 18, further comprising:
  instructing, with the processor, the telemetry monitoring application to provide a status update on the telemetry sensor controller, the status update indicating whether the telemetry monitoring application is communicating with the telemetry sensor controller.

20. The method of claim 18, further comprising:
  deploying a telemetry application package to a plurality of central management systems;
  monitoring a deployment rate at which the telemetry application package is deployed to the plurality of central management systems; and
  adjusting the deployment rate based on a number of successful deployments of the telemetry application package.

21. The method of claim 20, further comprising:
  adjusting the deployment rate by increasing the deployment rate when the number of successful deployments of the telemetry application package exceeds a predetermined threshold rate.

22. The method of claim 20, further comprising:
  controlling versioning of the telemetry application package based on a number of successful deployments of the telemetry application package.

* * * * *